US008413067B2

(12) United States Patent  
Cohen et al.

(10) Patent No.: US 8,413,067 B2  
(45) Date of Patent: Apr. 2, 2013

(54) GRAPHICAL ICON PRESENTATION

(75) Inventors: Gabriel Aaron Cohen, Alameda, CA (US); Paul T. Westbrook, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,205

(22) Filed: Sep. 29, 2011

(65) Prior Publication Data

US 2012/0324384 A1 Dec. 20, 2012

Related U.S. Application Data

(63) Continuation of application No. 13/163,056, filed on Jun. 17, 2011.

(51) Int. Cl.
*G06F 3/048* (2006.01)
*G06F 3/02* (2006.01)
*G06F 3/041* (2006.01)

(52) U.S. Cl. ........ 715/773; 715/764; 715/765; 715/815; 345/168; 345/173

(58) Field of Classification Search .................. 715/773, 715/815, 864, 865; 345/168, 173, 175
See application file for complete search history.

(56) References Cited

U.S. PATENT DOCUMENTS

| | | | | |
|---|---|---|---|---|
| 6,243,074 B1 * | 6/2001 | Fishkin et al. | ................. | 345/156 |
| 6,411,275 B1 * | 6/2002 | Hedberg | ........................ | 345/156 |
| 6,933,926 B2 * | 8/2005 | Ukita et al. | .................... | 345/168 |
| 7,068,256 B1 * | 6/2006 | Gettemy et al. | .............. | 345/156 |
| 7,385,592 B2 * | 6/2008 | Collins | ......................... | 345/173 |
| 7,401,300 B2 * | 7/2008 | Nurmi | ........................... | 715/866 |
| 7,730,402 B2 | 6/2010 | Song | | |
| 7,730,422 B2 * | 6/2010 | Russo | ............................ | 715/815 |
| 7,800,592 B2 * | 9/2010 | Kerr et al. | ..................... | 345/173 |
| 2002/0021278 A1 * | 2/2002 | Hinckley et al. | ............. | 345/156 |
| 2004/0183834 A1 * | 9/2004 | Chermesino | .................. | 345/773 |
| 2007/0083276 A1 | 4/2007 | Song | | |
| 2008/0165255 A1 * | 7/2008 | Christie et al. | .......... | 348/207.99 |
| 2009/0058809 A1 * | 3/2009 | Vuong et al. | .................. | 345/168 |

(Continued)

FOREIGN PATENT DOCUMENTS

| | | |
|---|---|---|
| EP | 2133778 A2 | 12/2009 |
| WO | 2010147611 A1 | 12/2010 |

OTHER PUBLICATIONS

"Split Keyboard for iPad [Concept]," Redmond Pie, retrieved from http://www.redmondpie.com/split-keyboard-for-ipad-9140675/, dated Apr. 23, 2010, 6 pp.

"Split Keyboard for Thumb Typing Coming to iPad with iOS 5," retrieved from www.gottabemobile.com, dated Jun. 6, 2011, 8 pp.

(Continued)

*Primary Examiner* — Tadeese Hailu  
(74) *Attorney, Agent, or Firm* — Shumaker & Sieffert, P.A.

(57) ABSTRACT

Aspects of this disclosure may be directed to one or more techniques for a mobile device to present a graphical user-interface with different graphical user-interface layouts. The mobile device may present the different graphical user-interface layouts based on whether the mobile device is resting or not resting against a surface. For example, the mobile device may present a graphical user-interface layout that is more conducive for user interface when the mobile device is not held against a surface. The mobile device may present another graphical user-interface layout that is more conducive for user interaction when the mobile device is held against a surface.

10 Claims, 9 Drawing Sheets

U.S. PATENT DOCUMENTS

| | | | |
|---|---|---|---|
| 2009/0163139 A1* | 6/2009 | Wright-Riley | 455/39 |
| 2009/0189864 A1 | 7/2009 | Walker et al. | |
| 2009/0209293 A1 | 8/2009 | Louch | |
| 2009/0259969 A1 | 10/2009 | Pallakoff | |
| 2009/0303200 A1* | 12/2009 | Grad | 345/173 |
| 2010/0013780 A1* | 1/2010 | Ikeda et al. | 345/173 |
| 2010/0134423 A1* | 6/2010 | Brisebois et al. | 345/173 |
| 2010/0141484 A1* | 6/2010 | Griffin et al. | 341/22 |
| 2010/0146444 A1* | 6/2010 | Wang et al. | 715/815 |
| 2010/0214267 A1 | 8/2010 | Radivojevic et al. | |
| 2010/0302155 A1* | 12/2010 | Sands et al. | 345/163 |
| 2011/0074692 A1 | 3/2011 | Causey et al. | |
| 2011/0242138 A1* | 10/2011 | Tribble | 345/663 |
| 2012/0032891 A1* | 2/2012 | Parivar | 345/173 |
| 2012/0032894 A1* | 2/2012 | Parivar et al. | 345/173 |
| 2012/0117506 A1* | 5/2012 | Koch et al. | 715/773 |
| 2012/0127069 A1* | 5/2012 | Santhiveeran et al. | 345/156 |

OTHER PUBLICATIONS

U.S. Appl. No. 13/163,056, by Gabriel A. Cohen, filed Jun. 17, 2011.
Invitation to Pay Additional Fees and, Where Applicable, Protest Fee of the International Searching Authority, for corresponding International Application No. PCT/US2012/042091, mailed Sep. 6, 2012 (5 pages).
Office Action from U.S. Appl. No. 13/163,056, dated Jul. 24, 2012, 12 pgs.
Response to Office Action dated Jul. 24, 2012, from U.S. Appl. No. 13/163,056, filed Oct. 18, 2012, 13 pp.
International Search Report and Written Opinion, International Application No. PCT/US2012/042091, dated Jan. 15, 2013, 17 pp.

* cited by examiner

GRAPHICAL ICON PRESENTATION

This application is a continuation of U.S. application Ser. No. 13/163,056, filed Jun. 17, 2011, the entire contents of which are incorporated herein by reference.

TECHNICAL FIELD

This disclosure generally relates to presentation of graphical icons.

BACKGROUND

A mobile device may present a graphical keyboard using the display of the device. The graphical keyboard may include a plurality of icons that each represents one character. The user may be able to enter text by touching appropriate icons. For example, to type the letter "b," the user may touch the icon of the graphical keyboard that depicts or otherwise represents the character "b." The graphical keyboard may also include icons representing functional keys typically found on a classical keyboard such as tab, spacebar, enter (return), or other functional keys.

SUMMARY

In one example, the disclosure is directed to a method that includes determining, with a mobile device, whether the mobile device is resting against a surface that is not associated with a hand of a user of the mobile device, presenting, with a presence-sensitive screen of the mobile device, a first graphical user-interface layout when the mobile device determines that the mobile device is resting against the surface, and presenting, with the presence-sensitive screen of the mobile device, a second graphical user-interface layout, different from the first graphical user-interface layout, when the mobile device determines that the mobile device is not resting against the surface.

In another example, the disclosure is directed to a computer-readable storage medium comprising instructions that, when executed, cause one or more processors of a mobile device to perform operations that include determining whether the mobile device is resting against a surface that is not associated with a hand of a user of the mobile device, presenting, with a presence-sensitive screen of the mobile device, a first graphical user-interface layout when it is determined that the mobile device is resting against the surface, and presenting, with the presence-sensitive screen of the mobile device, a second graphical user-interface layout, different from the first graphical user-interface layout, when it is determined that the mobile device is not resting against the surface.

In another example, the disclosure is directed to a mobile device that includes a presence-sensitive screen, means for determining whether the mobile device is resting against a surface that is not associated with a hand of a user of the mobile device, and one or more processors that cause the presence-sensitive screen to present a first graphical user-interface layout when the means for determining determines that the mobile device is resting against the surface, and to present a second graphical user-interface layout, different from the first graphical user-interface layout, when the means for determining determines that the mobile device is not resting against the surface.

Aspects of this disclosure may provide one or more advantages. For example, the mobile device may present different graphical user-interface layouts, e.g., user-interface graphical icons such as a graphical keyboard or icons for applications as two non-limiting examples, based on the placement of the mobile device or based on the manner in which the user is holding the mobile. These different graphical user-interface layouts may make it easier for the user to type on the graphical keyboard, or to select different applications. For instance, the user may find it easier to type on or select applications from a first graphical user-interface layout when the mobile device is resting against the surface. However, the first graphical user-interface layout may not be conducive for typing or selecting applications when the mobile device is not resting against the surface. In this instance, the mobile device may present a second graphical user-interface layout. The second graphical user-interface layout may be more conducive, than the first graphical user-interface layout, for typing or selecting applications when the mobile device is not resting against the surface.

The details of one or more aspects of the disclosure are set forth in the accompanying drawings and the description below. Other features, objects, and advantages of the disclosure will be apparent from the description and drawings, and from the claims.

DETAILED DESCRIPTION

Figures 1A, 1B:
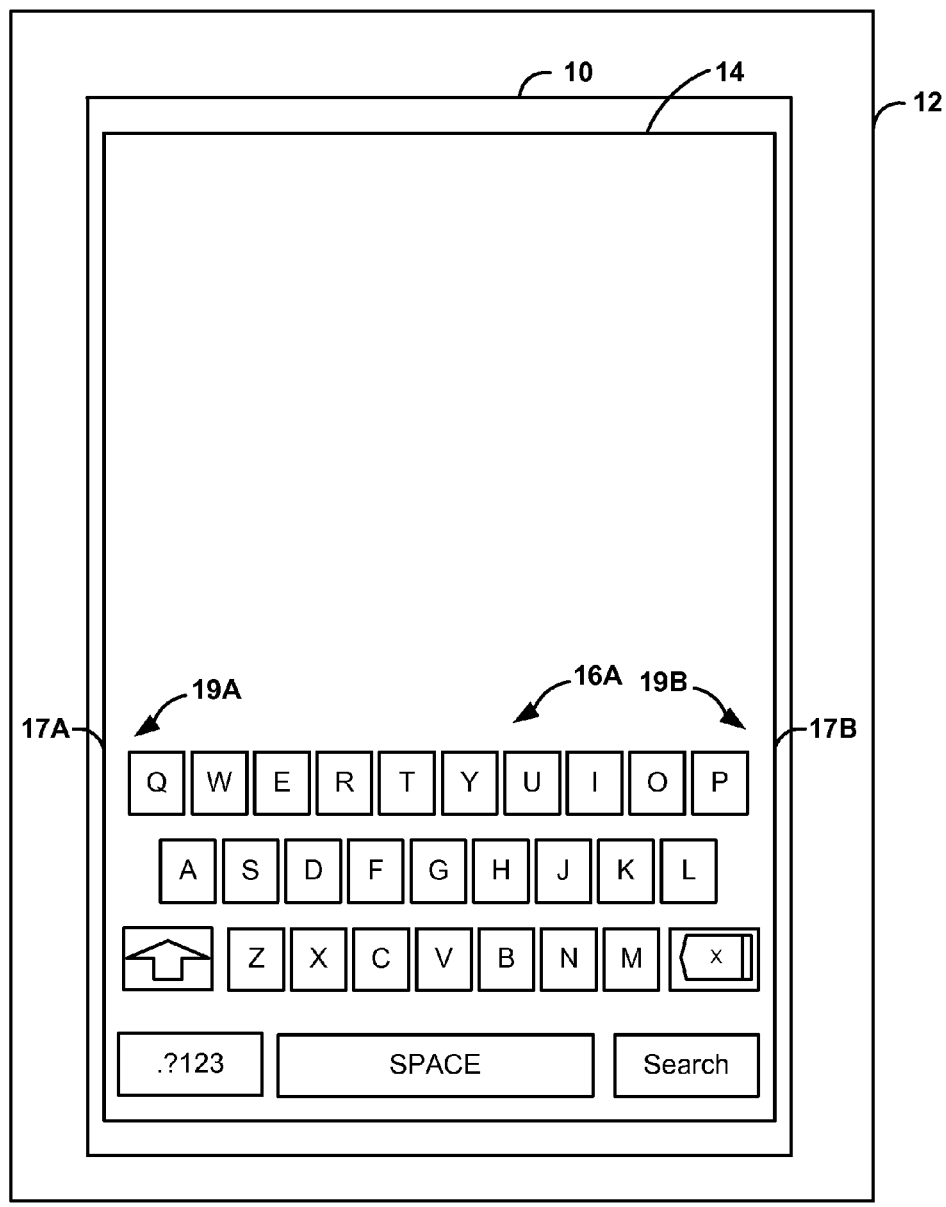
FIG. 1A is a side view of a mobile device resting against a surface.
FIG. 1B is a top view of a mobile device resting against a surface.

Example techniques described in this disclosure may be related to automatically presenting a graphical user-interface in response to device placement and/or based on the manner in which a user is holding the device. Examples of the graphical user-interface may include, but are not limited to, a graphical keyboard layout, and graphical icons used to select applications stored on the device. Many handheld mobile devices such as tablets or smart phones provide a presence-sensitive screen, an example of which is a touch-screen and/or other presence sensors. With the presence-sensitive screen, the user may interact with the mobile device. For instance, the presence-sensitive screen may present a graphical user-interface, and the user may interact with the mobile device by utilizing the graphical user-interface.

As one example, in some cases, the user may desire to input words, and to accommodate such inputs, a mobile device may display a graphical keyboard, which is one example of the graphical user-interface, with the presence-sensitive screen. The graphical keyboard may present alpha-numeric icons that present numerals and letters, as well as icons for other functional keys typically found on a classical keyboard such as tab, spacebar, enter (return), or other functional keys. The user may be able to input words by selecting appropriate icons on the displayed graphical keyboard.

As another example, in some cases, the user may desire to execute an application. To allow the user to execute an application, the mobile device may display an icon that the user selects to execute the desired application. The icons used to execute desired applications may be another example of the graphical user-interface.

In examples of this disclosure, the mobile device may present different graphical user-interface layouts based on when the mobile device is in a resting position or a non-resting position. The resting position refers to positions where the mobile device is supported by a surface. For example, when the mobile device is resting on a desk, a stand, or in the user's lap, the mobile device may be considered as being placed in the resting position. As another example, when the user lifts up the mobile device with one or both hands, the mobile device may be considered as being placed in the non-resting position.

For example, when the mobile device is placed in a resting position, the mobile device may display a graphical user-interface layout. When the mobile device is not in the resting position, the mobile device may display another, different graphical user-interface layout. The displayed graphical user-interface layout, when the mobile device is in the resting position, may be conducive to user interaction with the mobile device being in the resting position. For example, when the mobile device is in the resting position, the graphical user-interface layout may be conducive for user interaction with both hands where neither hand is necessarily holding the mobile device. The displayed graphical user-interface layout, when the mobile device is not in the resting position, may be conducive to user interaction with the mobile device being in the non-resting position. For example, when the mobile device is in the non-resting position, the displayed graphical user-interface may be more conducive for user interaction with one hand, or with both hands, in a fixed position, when both hands are holding the mobile device.

In some examples of this disclosure, when the mobile device is placed in a resting position, the mobile device may display a graphical keyboard, which is one example of the graphical user-interface, in a continuous layout and in the middle of the presence-sensitive screen, e.g., centered at the bottom of the presence-sensitive screen. A continuous graphical keyboard layout may refer to a graphical keyboard where the distance between each neighboring icon is substantially a same distance. The middle of the presence-sensitive screen may be the middle of the horizontal or vertical axis of the presence-sensitive screen.

In these examples, when the mobile device is placed in a non-resting position, the mobile device may display the graphical keyboard in a split graphical keyboard layout, or in a continuous graphical keyboard layout (as two non-limiting examples), but not necessarily in the middle of the presence-sensitive screen. One example of the non-resting position may be where the user is holding the mobile device with either one or both hands.

When the user is holding the mobile device with one hand, it may be possible for the holding hand to partially occlude the graphical keyboard, if the graphical keyboard were presented in the middle of the presence-sensitive screen. In some examples, the mobile device may determine that the user is holding the mobile device with one hand. In response to the determination, the mobile device may display a continuous graphical keyboard layout that is not in the center of the presence-sensitive screen, but rather spaced from the location where the user is holding the mobile device. For example, the mobile device may display a continuous graphical keyboard layout that is located in the opposite end from where the user is holding the mobile device. In this manner, the user may be able to type with the other hand (e.g., the hand not holding the mobile device), without the displayed graphical keyboard being occluded by the hand that is holding the device.

When the user is holding the mobile device with both hands, it may be difficult for the user to reach all keys of a continuous graphical keyboard layout. In these examples, the mobile device may split the continuous graphical keyboard layout into a split graphical keyboard layout. For example, the mobile device may split the continuous graphical keyboard layout into two separate sections. Each of the two separate sections may be disjointed halves of the continuous graphical keyboard layout. In the split graphical keyboard layout, some of the icons of the graphical keyboard that are neighboring one another in the continuous graphical keyboard layout may be separated by a relatively large distance of the presence-sensitive screen. The mobile device may present one of the separate sections, e.g., one of the disjointed halves, at one end of the presence-sensitive screen near one of the user's hands, and the other of the separate sections, e.g., the other of the disjointed halves, at the other end of the presence-sensitive screen near the other one of the user's hand. In some examples, the disjointed halves may be presented proximate to where the user is holding the mobile device. For instance, one of the disjointed halves may be proximate to the left hand, and the other disjointed half may be proximate to the right hand.

As another example, when the mobile device is in the resting position, the mobile device may display graphical application icons, which are another example of the graphical user-interface, with a particular length and width and with a particular spacing between the icons. For example, the mobile device may arrange the graphical application icons into rows and columns, and display the rows and columns of the application icons. The right and left end columns of the graphical application icons may be at a particular distance from the left and right ends of the presence-sensitive screen.

When the user is holding the mobile device with one hand, it may be possible for the holding hand to partially or fully occlude one or more of the graphical application icons. In this example, the mobile device may display the graphical application icons on the opposite end of the presence-sensitive screen from the end where the user is holding the mobile device. The mobile device may, in some examples, reduce the width or the width and length of the graphical application icons and/or the spacing between the graphical application icons to fit the graphical application icons on the opposite end of the presence-sensitive screen, which is the opposite end from where the user is holding the mobile device.

When the user is holding the mobile device with both hands, it may be possible for both holding hands to partially or fully occlude one or more graphical application icons. In this example, the mobile device may display the left and right end columns of graphical application icons further away from the left and right ends of the presence-sensitive screen. The mobile device may also reduce the width or the width and length of the graphical application icons and/or the spacing between the graphical application icons to properly fit the graphical application icons on the presence-sensitive screen.

In one or more aspects of this disclosure, the mobile device may determine whether the mobile device is in a resting position or a non-resting position based on various techniques. For example, the mobile device may utilize a gyroscope and/or an accelerometer to determine whether the mobile device is moving or is still. For instance, when the mobile device is resting, it may not be moving, but when the user is holding the mobile device (either with one hand or both hands) the mobile device may move, or at least move more than when resting against the surface.

As another example, the mobile device may also utilize sensors on the side of the mobile device to determine whether the user is holding the mobile device. For instance, when the mobile device is resting, the user may not hold the sides of the mobile device. The sensors may also indicate whether the user is holding the mobile device with one or both hands. For instance, the mobile device may include pressure, proximity, temperature, or moisture sensors on its sides, as a few examples. The mobile device may determine whether the user is holding the mobile device with one or more both hands based on which sensors detect pressure, proximity, temperature, or moisture.

As yet another example, the mobile device may utilize its camera to determine whether the mobile device is resting or moving. For instance, when the mobile device is resting against a surface, the camera of the mobile device may not detect any motion changes, but when the user is holding the mobile device, the camera may detect motion changes.

As still another example, the mobile device may detect when it is docked into a docking station. The mobile device may be considered as being in the resting position when docked to the docking station. The mobile device may include connection points that mate with connection points on a docking station. When the mobile device detects that its connection points have mated, the mobile device may determine that it is in resting position.

In some examples, the mobile device may use one or more of the techniques described above to determine whether the mobile device is in a resting position or a non-resting position. For example, the mobile device may utilize the measurements from the accelerometer and/or gyroscope, one or more of the sensors on the side of the mobile device, the camera, and the detection of being docket or not, to determine whether the mobile device is in an resting position or a non-resting position. In some examples, the mobile device may use a subset of these example techniques to determine whether the mobile device is in a resting position or a non-resting position.

FIG. 1A is a side view of a mobile device resting against a surface. FIG. 1B is a top view of a mobile device resting against a surface. For example, FIGS. 1A and 1B illustrate mobile device 10 resting against surface 12. Examples of mobile device 10 include, but are not limited to, cellular phones, personal digital assistants (PDAs), portable gaming devices, portable media players, e-book readers, tablet computing devices, and the like. In general, mobile device 10 may be any device that presents a graphical keyboard, such as a graphical keyboard illustrated in FIG. 1B. For purposes of illustration and ease of description, the examples described in the disclosure are described in the context of mobile device 10 being a tablet computing device. However, aspects of this disclosure should not be considered limited to mobile device 10 being a tablet computing device.

Surface 12 may be any type of surface upon which mobile device 10 can rest against. When mobile device 10 is resting against a surface, such as surface 12, a user of mobile device 10 may not be holding one or more sides of mobile device 10 with either one or both hands. For instance, the surface may be a surface that is not a hand of the user of the mobile device. For example, surface 12 may be flat surface such as a desk. As another example, surface 12 may be the lap of a user. In this example, the user may place mobile device 10 on the user's lap and interact with mobile device 10 with mobile device 10 being on the user's lap. Furthermore, although FIGS. 1A and 1B illustrate surface 12 as being a flat and horizontal surface, aspects of this disclosure are not so limited. For example, surface 12 may be a stand that is tilted at an angle less than 90° relative to another surface. For instance, the stand may be a triangular stand. In this example, the base of the triangular stand may be flat against a surface, and mobile device 10 may be resting against of the sides of the triangle. In this example, the side of the stand upon which mobile device 10 is resting may be one example of surface 12. Also, the sides of the triangular stand may be less than 90° relative to the base of the triangular stand.

It should be understood that the examples of surface 12 described above are provided for purposes of illustration, and should not be considered limiting. For example, the stand may not necessarily be a triangular stand, and surface 12 may not necessarily be a flat surface. As one other example, mobile device 10 may be docked into a docking station. In this example, surface 12 may be the base of the docking station. In general, surface 12 may be considered as any surface upon which mobile device 10 can balance without the user needing to hold one or more sides of mobile device 10 to balance mobile device 10. For instance, if at least one of the length or width of surface 12 is greater than the corresponding length or width of mobile device 10, mobile device 10 may balance with relative ease on surface 12. For instance, FIGS. 1A and 1B illustrate the surface area of surface 12 being greater than the surface area of mobile device 10. However, it should be noted that the example techniques described in this disclosure should not be considered limited to only examples where at least the length or width of surface 12 is greater than the corresponding length or width of mobile device 10.

As illustrated in FIG. 1B, mobile device 10 may include display 14. Display 14 may be a presence-sensitive screen, an example of which is a touch-screen. For example, a user of mobile device 10 may be able to interact with mobile device 10 with display 14. In these examples, display 14 may function as a user interface for mobile device 10.

The user may interact with mobile device 10 for various reasons. For example, the user may execute an application, such as a game application, a word processing application, an application to view pictures, a web browser, and the like, by touching a graphical application icon for the application displayed on display 14. One of the user interactions may be to input words or letters into mobile device 10. For example, after the user executes the web browser, the user may desire to type in the web address for a desired web site. As another example, the user may execute an e-mail application, and may desire to compose an e-mail.

To allow the user to enter characters, mobile device 10 may cause display 14 to present a graphical user-interface. For example, as illustrated in FIG. 1B, when mobile device 10 is resting against surface 12, mobile device 10 may cause display 14 to display graphical keyboard 16A in the layout illustrated in FIG. 1B. Graphical keyboard 16A may be one example of the graphical user-interface, and the layout of graphical keyboard 16A may be one example of a graphical user-interface layout. As illustrated in FIG. 1B, graphical keyboard 16A may present alpha-numeric icons that each present numerals and letters, as well as icons for other functional keys typically found on a classical keyboard such as tab, spacebar, enter (return), or other functional keys. The user may be able to input characters by selecting appropriate icons on the displayed graphical keyboard 16A.

For purposes of illustration, graphical keyboard 16A is illustrated as the standard "QWERTY" keyboard. However, aspects of this disclosure should not be considered limited to the "QWERTY" keyboard, and can be extended to different types of keyboards or other input interfaces, such as number pads, or other palates of objects. Moreover, aspects of this disclosure should not considered limited to graphical keyboards generally used to type in English. Aspects of this disclosure may be extended to graphical keyboards used to type in any variety of different languages.

The layout of graphical keyboard 16A may function well when mobile device 10 is resting against surface 12. As described above, surface 12 may be a surface that is not associated with a hand of a user of mobile device 10. As one example, the layout of graphical keyboard 16A may be a continuous graphical keyboard that is approximately centered along the horizontal axis of display 14. The phrase "continuous graphical keyboard" may mean that the distance between each neighboring icons is substantially a same distance. For example, the distance between the icon "T" and the icons "R" and "Y" is relatively small, and is approximately the same distance. The phrase "centered along the horizontal axis of display 14" may mean that the distance from the right and left ends of display 14 to the ends of the graphical keyboard may be approximately the same.

For example, FIG. 1B illustrates display 14 in portrait layout. As shown in FIG. 1B, the distance from the right end 17B of display 14 to the right end 19B of graphical keyboard 16A is approximately the same as the distance from the left end 17A of display 14 to the left end 19A of graphical keyboard 16A. Similarly, if display 14 were in the landscape layout, e.g., rotated 90°, graphical keyboard 16A would also rotate 90°. In the landscape layout, the distance from the right and left ends of display 14, which were the top and bottom ends in the portrait layout, to the ends of graphical keyboard 16A may be approximately the same.

When mobile device 10 is in a resting position, e.g., when resting against surface 12, the user may find it relatively easy to type on graphical keyboard 16A in the layout illustrated in FIG. 1B. For example, the layout of graphical keyboard 16A, e.g., a continuous graphical keyboard that is centered along the horizontal axis of display 14, appears like a classical keyboard layout. When mobile device 10 is in the resting position, both of the user's hands may be free, and the user may find it easy to type as the user may on a classical keyboard. For example, many users may use both hands to type by placing four fingers of the left hand on the "A," "S," "D," and "F" icons, respectively, and placing four fingers of the right hand on the "H," "J," "K," and "L" icons, respectively, in the example illustrated in FIG. 1B. The user may use either one or both thumbs for the "SPACE" icon.

However, when mobile device 10 is not resting against surface 12, e.g., not in a resting position, the user may find it difficult to type on a continuous graphical keyboard that is centered along the horizontal axis of display 14. For example, when the user lifts up mobile device 10 from surface 12 with one hand, only one hand may be available for typing. For instance, the user may grasp the left side of mobile device 10 with the user's left hand, and lift up mobile device 10. Then to type, the user may not be able to use the left hand, and may be limited to using the right hand.

In this example, where the user is holding mobile device 10 with one hand, the user may "hunt-and-peck" to type. For example, the user may "hunt" for the icon for a desired letter or number, and select that icon with one finger of the hand not holding mobile device 10, e.g., "peck." When holding mobile device 10 with one hand, a user may find it difficult to type on a continuous graphical keyboard that is centered along the horizontal axis of display 14, such as the layout of graphical keyboard 16A.

For example, assume the user is holding mobile device 10 with his left hand. In this example of graphical keyboard 16A, it may possible for one or more of the "Q," "W," "A," "S," and "Z" icons to be covered by the user's hand. The user may find it cumbersome to select any one of these icons because the user's left hand is covering one or more of these icons. Also, such covering of one or more of these icons may cause the user to accidentally select one or more of these icons. A similar situation may arise if the user is holding mobile device 10 with his right hand, and "hunting-and-pecking" with his left hand, albeit for one or more of the "O," "P," "K," "L," and "M" icons, in this example of graphical keyboard 16A.

In some examples, to address such a possible limitation of graphical keyboard 16A, mobile device 10 may determine whether mobile device 10 is resting against a surface, such as surface 12. If mobile device 10 determines that it is being held against a surface, mobile device 10 may present a graphical user-interface, e.g., graphical keyboard 16A, in the graphical keyboard layout illustrated in FIG. 1B, e.g., a continuous graphical keyboard that is centered along substantially the horizontal axis of display 14. If mobile device 10 detects that it is not being held against a surface, mobile device 10 may present a graphical user-interface in a graphical user-interface, e.g., a graphical keyboard in a graphical keyboard layout, that is different than the layout of graphical keyboard 16A.

For example, in the example where the user holds mobile device 10 with one hand, mobile device 10 may cause display 14 to display a graphical keyboard that is graphically positioned towards an end of display 14 that is opposite to the side where the user is holding mobile device 10. For instance, if the user is holding mobile device 10 with the user's left hand, mobile device 10 may cause display 14 to display a graphical keyboard that is graphically positioned towards the right end of display 14. It should be understood that in this disclosure the "right" and "left" directions are described from the perspective of the user. For example, the phrase "graphically positioned towards the right end of display 14" may mean the right end of display 14 from the perspective of the user.

In the examples where the graphical keyboard is graphically positioned towards an end of display 14, the layout of such a graphical keyboard may be a continuous graphical keyboard that is graphically positioned towards an end of display 14, and no longer centered along the horizontal axis of display 14. One example of a graphical keyboard layout which is a continuous graphical keyboard that is graphically positioned towards an end of display 14 is illustrated in more detail in FIG. 2B. In some examples, the continuous graphical keyboard that is graphically positioned towards an end of display 14 may be graphically positioned towards the end of display 14 that is opposite from the side where the user is holding mobile device 10.

When the graphical keyboard layout is a continuous graphical keyboard that is graphically positioned towards an end of display 14, the user may be able to "hunt-and-peck" to type easier than the user could when the graphical keyboard layout is the graphical keyboard layout of graphical keyboard 16A. For example, with the graphical keyboard is graphically positioned towards an end, the user's hand is less likely to cover one or more icons of the graphical keyboard as compared to the layout of graphical keyboard 16A.

For instance, if the user is holding mobile device 10 with the user's left hand, the user may be holding mobile device 10 on the left side of mobile device 10. In this example, mobile device 10 may determine that the user is holding the left side of mobile device 10. In response to the determination, mobile device 10 may cause display 14 to display a graphical keyboard that is a continuous graphical keyboard that is graphically positioned towards the right end of display 14. In this manner, the user may be able to easily type on the graphical keyboard with the user's right hand. Moreover, the icons of the graphical keyboard, which may have been covered by the user's left hand in the graphical keyboard layout of graphical keyboard 16A, may not be covered in this example. Because it is less likely for the icons of the graphical keyboard to be covered by the user's hand, the user may be able to more easily type with the user's hand that is not holding mobile device 10.

The preceding examples describe where the user is holding mobile device 10 with one hand; however, aspects of this disclosure are not so limited. In some examples, the user may hold mobile device 10 with both hands. For example, instead of grasping only one side of mobile device 10, the user may grip two sides of mobile device 10, e.g., both the right and left sides of mobile device 10.

When the user is holding mobile device 10 with both hands, the graphical layout of graphical keyboard 16A, as illustrated in FIG. 1B, may not be conducive for typing. For example, when the user grips mobile device 10 with both hands, on opposite ends of mobile device 10, only the user's thumbs may be free to type because the fingers and palm of the user's hand may be used to grip mobile device 10. In this example, the user's thumbs may not reach some of the icons of graphical keyboard 16A. For instance, it may be difficult for the user to reach the "T," "Y," "F," "G," "H," "C," and "B" icons of graphical keyboard 16A in the layout of graphical keyboard 16A illustrated in FIG. 1B. Moreover, when the user is holding mobile device 10 with both hands, both hands may possibly cover icons of graphical keyboard 16A. For instance, the user's left hand may cover the "Q," "W," "A," "S," and "Z" icons, and the user's right hand may cover the "O," "P," "K," "L," and "M" icons of graphical keyboard 16A. Also, it may be possible for the user's fingers to accidentally select an icon that the user did not want to select.

As described above, in some examples, mobile device 10 may determine whether mobile device 10 is resting against surface 12. If mobile device 10 determines that it is in a resting position, e.g., resting against surface 12, mobile device 10 may present a graphical user-interface in a particular graphical user-interface layout, e.g., a graphical keyboard in the layout of graphical keyboard 16A. If, however, mobile device 10 determines that it is not in a resting position, e.g., not resting against surface 12, mobile device 10 may present a graphical user-interface in a layout different then the layout of the graphical-user interface when mobile device 10 is resting on surface 12. For instance, mobile device 10 may present a graphical keyboard in a layout different then the layout of graphical keyboard 16A when mobile device 10 is not resting on surface 12. For example, mobile device 10 may further determine whether the user is holding mobile device 10 with one hand. If the user is holding mobile device 10 with one hand, as described above, mobile device 10 may present a graphical keyboard that is graphically positioned towards an end of display 14 that is opposite to the side where the user is holding mobile device 10.

In some examples, mobile device 10 may also determine whether the user is holding mobile device 10 with both hands. If the user is holding mobile device 10 with both hands, mobile device 10 may present a split graphical keyboard layout. One example of the split graphical keyboard layout is illustrated in FIG. 2C.

The split graphical keyboard layout may be considered as dividing graphical keyboard 16A into two halves. Display 14 may present each of these two halves on opposite ends of display 14. For example, display 14 may present one half of the graphical keyboard in the split graphical keyboard layout towards a left end of display 14, and present the other half of the graphical keyboard in the split graphical keyboard layout towards a right end of display 14. Because each half of the graphical keyboard is on opposite ends of display 14, in the split graphical keyboard layout, the two halves may be considered as disjointed halves. For example, the distance between each half of the two halves may be relatively large and may appear disjointed as compared to the continuous graphical keyboard.

In some examples, display 14 may display each half at approximately the same vertical position on display 14 where the user is gripping mobile device 10. For example, if the user is gripping mobile device 10 with both hands at approximately the vertical-middle of mobile device 10, display 14 may present the two halves of the graphical keyboard at the vertical-middle of display 14. As another example, the user may grip the left side of mobile device 10 near the top of mobile device 10, and grip the right side of mobile device 10 near the bottom of mobile device 10. In this example, display 14 may present one half of the graphical keyboard near the top of the left end of display 14 that is near the user's left hand, and present the other half of the graphical keyboard near the bottom of the right end of display 14 that is near the user's right hand.

With the split keyboard layout, the user may find it easier to type on the graphical keyboard. For example, because each half of the graphical keyboard is closer to each of the user's hands, the user's thumbs may be able to access every icon in each half. For example, the user's thumb on the left hand may be able to access every icon on the graphical keyboard that is near the user's left hand. Similarly, the user's thumb on the right hand may be able to access every icon on the graphical keyboard that is near the user's right hand.

Figure 2A:
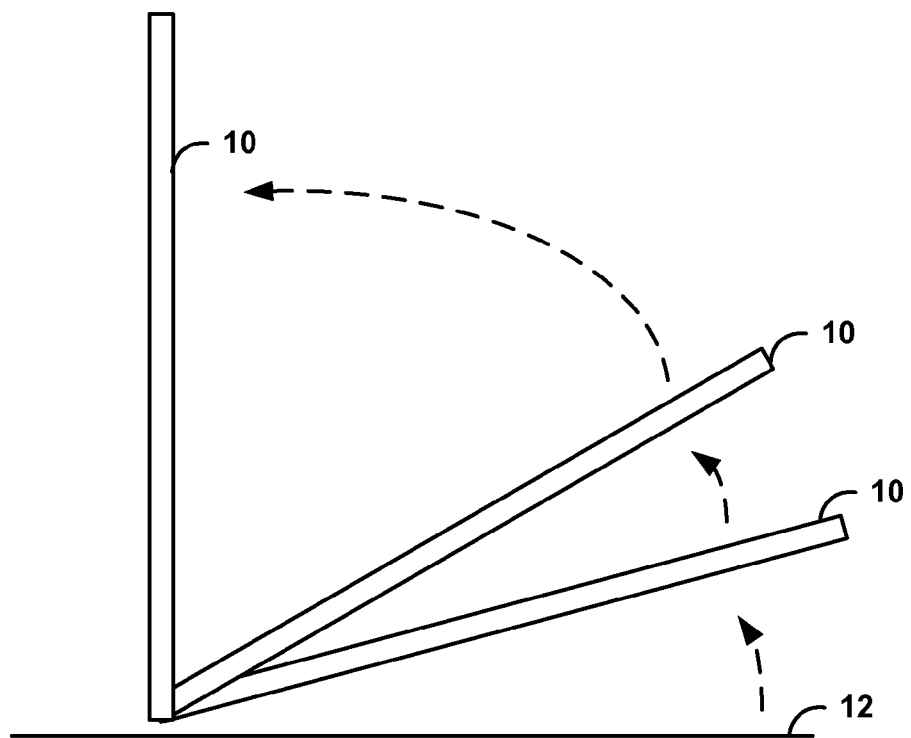
FIG. 2A is a side view of a mobile device that is not resting against a surface.

FIG. 2A is a side view of a mobile device that is not resting against a surface. For example, for purposes of illustration, FIG. 2A illustrates three possible positions of mobile device 10 where mobile device 10 is not resting against surface 12. For example, the user may lift up mobile device 10 with either one hand or both hands so that mobile device 10 is not resting against surface 12. It should be understood that the positions of mobile device 10 illustrated in FIG. 2A are illustrated for example purposes. The position of mobile device 10, when not resting against surface 12, should not be considered limited to the examples illustrated in FIG. 2A. In general, examples of mobile device 10 not resting against surface 12 may be examples where the user is holding mobile device 10 with either one or both hands.

Figure 2B:
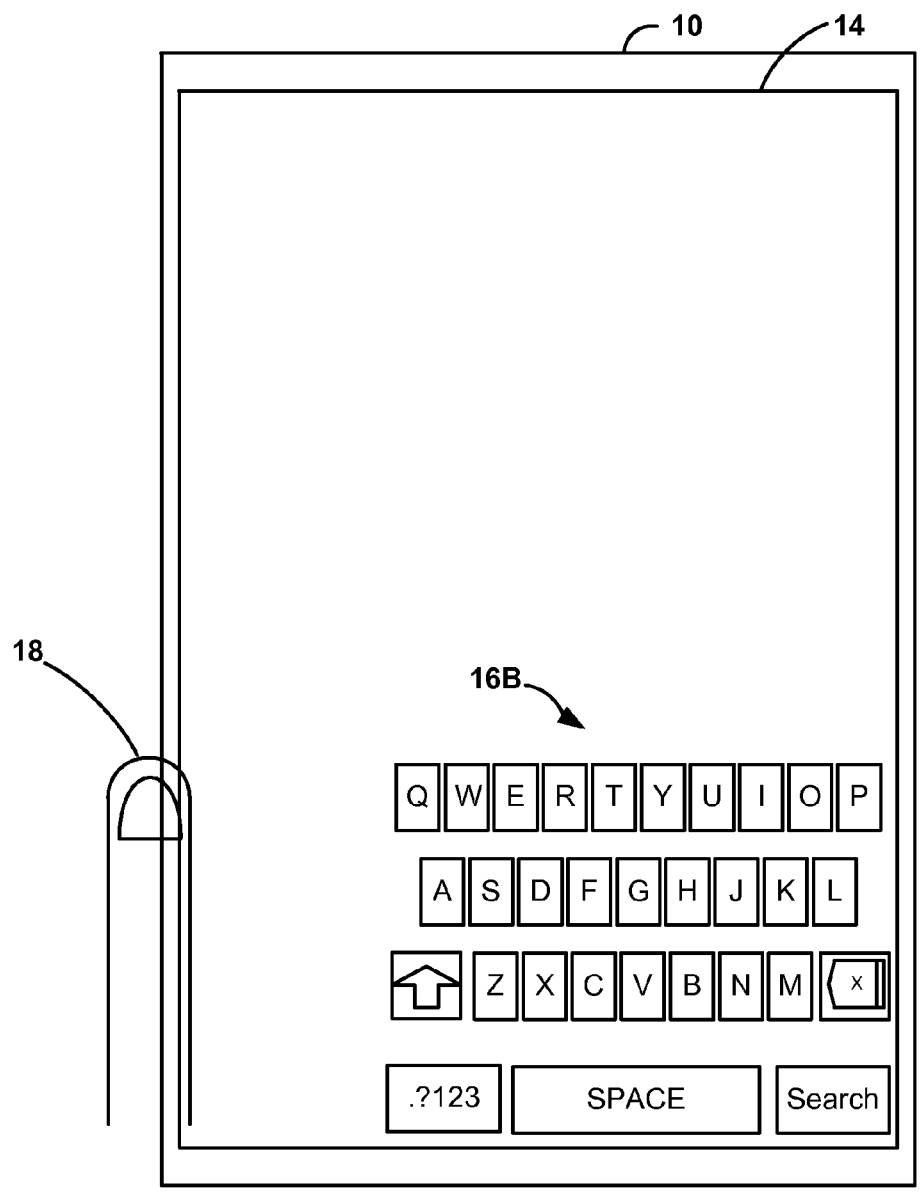
FIGS. 2B-2C are top views of a mobile device that is not resting against a surface.
Figure 2C:
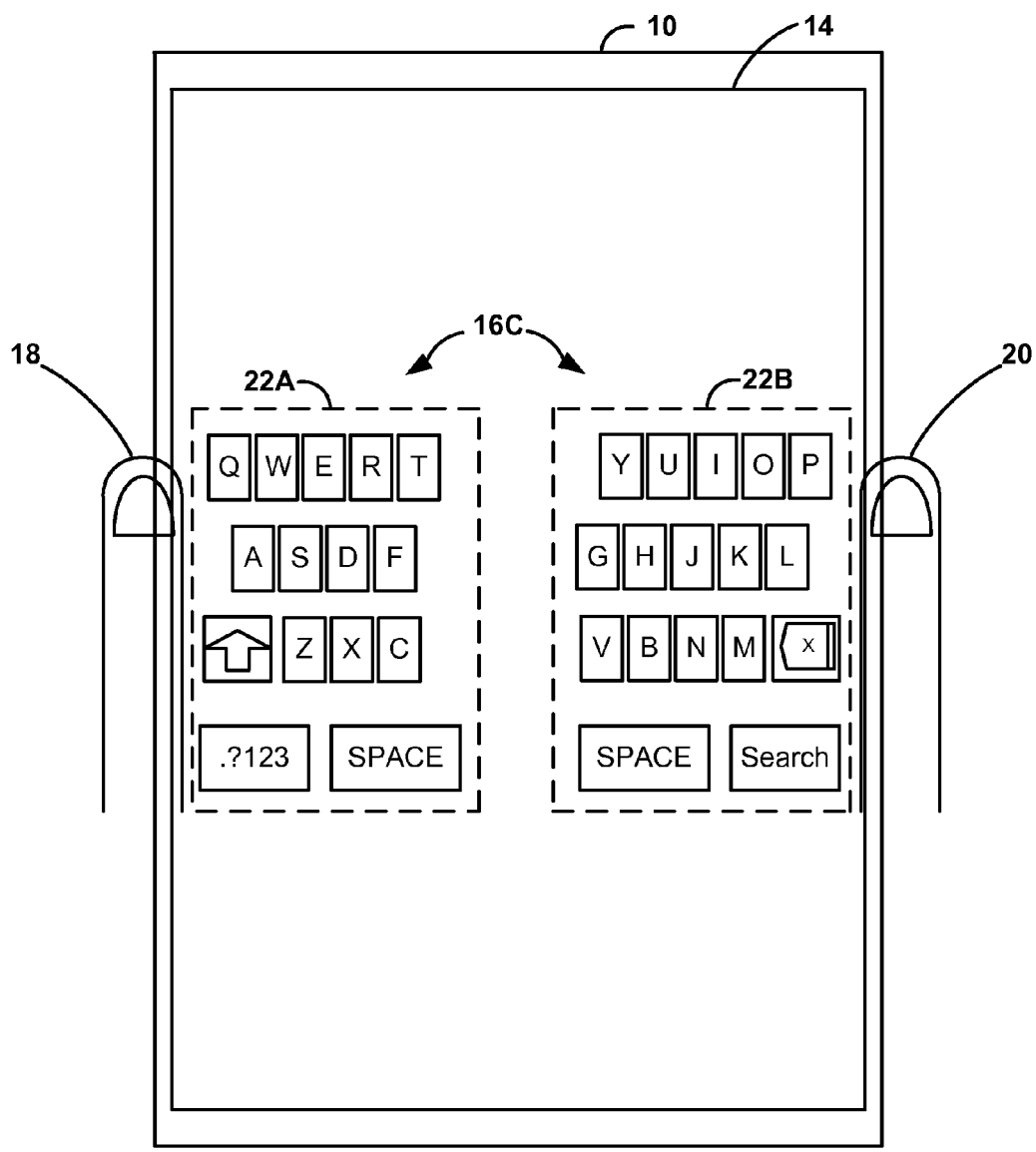

FIGS. 2B-2C are top views of a mobile device that is not resting against a surface. In the examples of FIGS. 2B and 2C, the phrase "top view" may mean from the perspective of the user. For example, the phrase "top view" may refer to the viewpoint of the user viewing mobile device 10.

The example illustrated in FIG. 2B may be an example where the user is holding mobile device 10 with one hand. For example, the user may grip the left side of mobile device 10 with the user's left hand. For purposes of illustration, FIG. 2B illustrates thumb 18 of the user's left hand.

Mobile device 10 may determine that it is not resting against surface 12, and may further determine that the user is holding mobile device 10 with one hand, in the example of FIG. 2B. In response, mobile device 10 may cause display 14 to present graphical keyboard 16B. Graphical keyboard 16B may be another example of a graphical user-interface, and the layout of graphical keyboard 16B may be another example of a graphical user-interface layout. As illustrated in FIG. 2B, the layout of graphical keyboard 16B may be a continuous graphical keyboard that is graphically positioned towards an end of display 14. In some examples, display 14 may present graphical keyboard 16B towards the end that is opposite to the side of mobile device 10 where the user is holding mobile device 10. For instance, in the example of FIG. 2B, the user may hold the left side of mobile device 10 with thumb 18, of the user's left hand, covering a portion of display 14. In this example, mobile device 10 may determine that the user is holding mobile device 10 with one hand, and on the left side of mobile device 10. In response, mobile device 10 may cause display 14 to present graphical keyboard 16B that is graphically positioned towards the right end of display 14.

As shown in FIG. 2B, thumb 18 may not cover any of the icons of graphical keyboard 16B. However, it may be possible for thumb 18 to cover one or more icons of graphical keyboard 16A. In the example illustrated in FIG. 2B, the user may be able to type, with relative ease, using the user's right hand because the icons of graphical keyboard 16B may not be covered by thumb 18.

The example illustrated in FIG. 2C may be an example where the user is holding mobile device 10 with both hands. For example, the user may grip the left side of mobile device 10 with the user's left hand, and grip the right side of mobile device 10 with the user's right hand. For purposes of illustration, FIG. 2C illustrates thumb 18 of the user's left hand, and thumb 20 of the user's right hand.

Thumbs 18 and 20 may have more freedom to move, as compared to thumb 18 illustrated in FIG. 2B, because holding mobile device 10 with both hands may provide additional support to mobile device 10, as compared to holding mobile device 10 with one hand (e.g., as illustrated in FIG. 2B). For example, in the example of FIG. 2C, the user may be able to type on graphical keyboard 16C using thumbs 18 and 20. However, in the example of FIG. 2B, the user may not be able to type with thumb 18 because thumb 18 may be needed to support mobile device 10. Graphical keyboard 16C may be another example of a graphical user-interface, and the layout of graphical keyboard 16C may be another example of a graphical user-interface layout.

Mobile device 10 may determine that it is not resting against surface 12, and may further determine that the user is holding mobile device 10 with both hands, in the example of FIG. 2C. In response, mobile device 10 may cause display 14 to present graphical keyboard 16C. As illustrated in FIG. 2C, the layout of graphical keyboard 16C may be a split graphical keyboard layout. For example, graphical keyboard 16C may include portion 22A and portion 22B. Portions 22A and 22B may each be portions of a continuous graphical keyboard, such graphical keyboard 16A or 16B. Portions 22A and 22B are illustrated for purposes of example, and should not be considered limited. In general, each one of portions 22A and 22B may include more or fewer icons of graphical keyboard 16C than illustrated in FIG. 2C.

Portions 22A and 22B may each be disjointed halves of a continuous graphical keyboard. For instance, in the continuous graphical keyboard, such as graphical keyboard 16A or 16B, the "T" icon and the "Y" icon are neighboring icons separated by a relatively small distance. In the example of FIG. 2C, the "T" icon and the "Y" icon, in graphical keyboard 16C, are separated by a relatively large distance, at least as compared to graphical keyboard 16A or 16B. In other words, the distance between each one of the neighboring icons in graphical keyboard 16A or 16B may be approximately the same distance; however, the distance between each one of the neighboring icons in graphical keyboard 16C may not be approximately the same distance.

In some examples, mobile device 10 may present portion 22A at one end of display 14, e.g., the left end of display 14, and present portion 22B at the opposite end of display 14, e.g., the right end of display 14. In some example, portions 22A and 22B may not completely abut their respective ends of display 14. Instead, there may be a slight gap between the end of display 14 and the end of each one of portions 22A and 22B. The distance of such a slight gap may be sufficient for thumbs 18 and 20 to not cover any of the icons. However, a slight gap between the edge of display 14 and the end of each one of portions 22A and 22B may not be necessary in every example. Because thumbs 18 and 20 may be able to move more freely, as compared to thumb 18 in FIG. 2B, the user may not necessarily consider it inconvenient if thumbs 18 and 20, in FIG. 2C, possibly cover a small area of portions 22A and 22B.

In some examples, mobile device 10 may cause display 14 to present portions 22A and 22B of graphical keyboard 16C in approximately the same vertical position as where the user is holding mobile device 10. For example, in FIG. 2C, as indicated by thumbs 18 and 20, the user may be holding mobile device 10 at approximately the vertical-middle of mobile device 10. In this example, mobile device 10 may cause display 14 to present portions 22A and 22B in approximately the vertical-middle of display 14. In this manner, it may be easier for the user to reach appropriate icons within portions 22A and 22B. However, it may not be necessary for mobile device 10 to line up the user's thumbs 18 and 20 with portions 22A and 22B in every example.

As can be seen in FIG. 2C, with the split graphical keyboard layout, e.g., the graphical keyboard layout of graphical keyboard 16C, the user may more easily access the icons of portions 22A and 22B. For example, in the example of FIG. 1B, the user's thumbs 18 and 20 may not be long enough to reach some of the icons of graphical keyboard 16A that are in the middle of graphical keyboard 16A. However, with the split graphical keyboard layout of graphical keyboard 16C, the user's thumbs 18 and 20 may be long enough to reach all of the icons of their respective portions 22A and 22B.

For purposes of illustration, aspects of this disclosure describe mobile device 10 as presenting a graphical keyboard with a layout similar to graphical keyboard 16B, when the user is holding mobile device 10 with one hand, and mobile device 10 as presenting a graphical keyboard with a layout similar to graphical keyboard 16C, when the user is holding mobile device 10 with both hands. However, aspects of this disclosure should not be considered so limited. For instance, it should be understood that the examples of FIGS. 2B and 2C are separate examples.

For example, in some instances, mobile device 10 may be configured to determine when the user is holding mobile device 10 with one hand, but may not determine when the user is holding mobile device 10 with both hands. In this example, mobile device 10 may present graphical keyboard 16B, when the user is holding mobile device 10 with one hand, but may not present graphical keyboard 16C, when the user is holding mobile device 10 with both hands.

Similarly, in some instances, mobile device 10 may be determine when the user is holding mobile device 10 with both hands, but may not determine when user is holding mobile device 10 with one hand. In this example, mobile device 10 may present graphical keyboard 16C, when the user is holding mobile device 10 with both hands, but may not present graphical keyboard 16B, when the user is holding mobile device 10 with one hand.

In general, mobile device 10 may determine whether it is resting against surface 12. If mobile device 10 determines that is it resting against surface 12, mobile device 10 may present a first graphical keyboard layout, e.g., a continuous graphical keyboard that is approximately centered along the horizontal axis of display 14, such as the layout of graphical keyboard 16A. If mobile device 10 determines that is it not resting against surface 12, mobile device 10 may present a second graphical keyboard layout that is different than the first graphical keyboard layout. For example, mobile device 10 may present a continuous graphical keyboard that is graphically positioned towards an end of display 14, such as the layout of graphical keyboard 16B, or a split graphical keyboard layout, such as the layout of graphical keyboard 16C. Mobile device 10 may present the continuous graphical keyboard that is graphically positioned towards an end of display 14, or the split graphical keyboard layout based on whether the user is holding mobile device 10 with one or more both hands, as detected by mobile device 10.

Figure 3A:
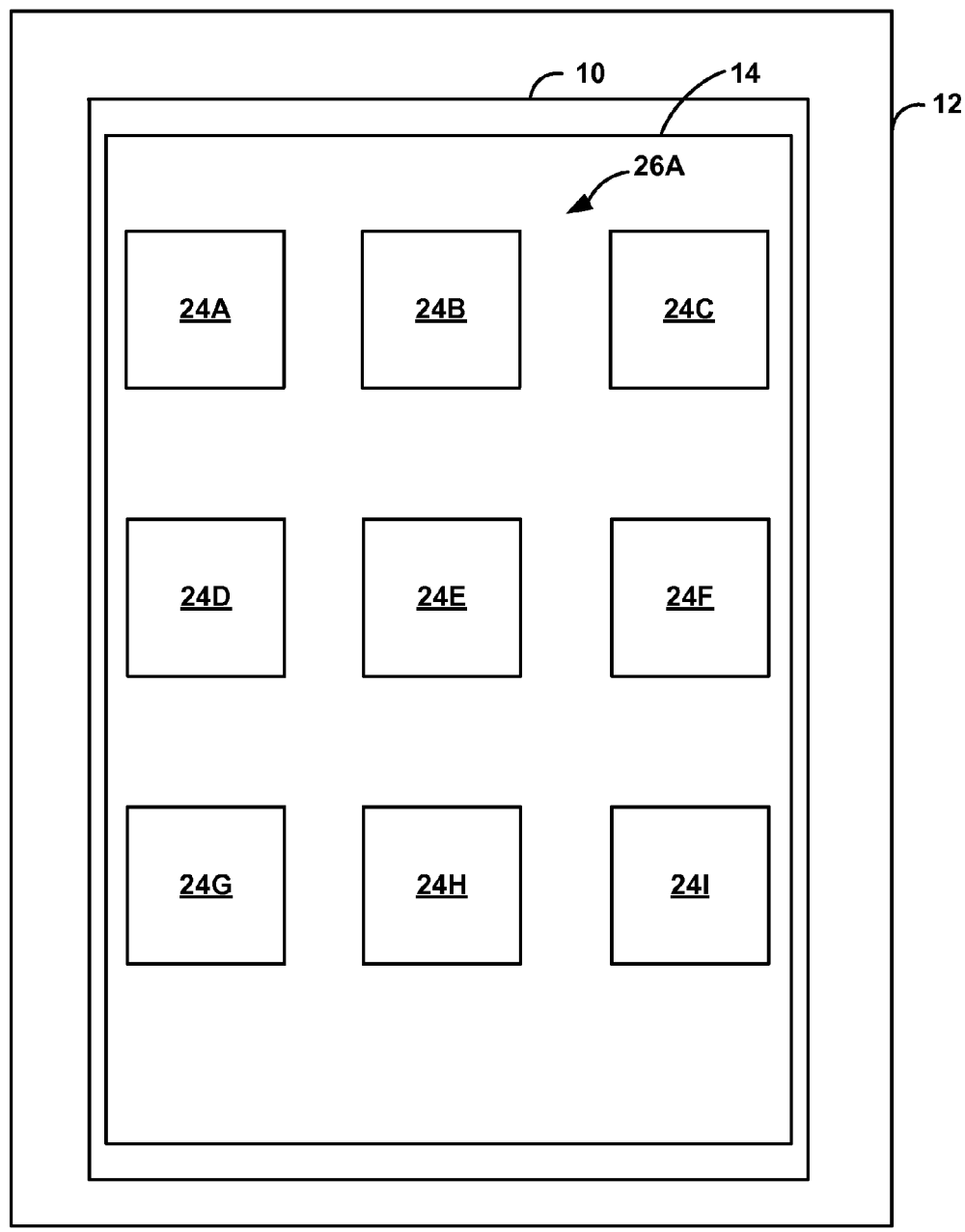
FIG. 3A is a top view of another mobile device resting against a surface.

FIG. 3A is a top view of another mobile device resting against a surface. Similar to FIG. 1B, in the example of FIG. 3A, mobile device 10 may be resting against surface 12. Display 14 may display graphical application icons 24A-24I (collectively referred to as "application icons 24"). Graphical application icons 24 may be another example of a graphical user-interface. For example, each of graphical application icons 24 may represent an application executable on mobile device 10. To execute an application, the user may select one of graphical icons 24 that corresponds to the desired application with display 24. The examples of the applications that correspond to each of graphical application icons 24 may be web browsers, games, e-mail applications, and any other application that is executable or accessible after execution by user interaction with display 14.

In some examples, mobile device 10 may arrange graphical application icons 24 in a row and column on display 14. This example arrangement of graphical application icons 24, as illustrated in FIG. 3A, may be referred to as graphical application icon layout 26A. Graphical application layout 26A may be another example of a graphical user-interface layout.

When the user grips mobile device 10 with one hand, it may be possible that the user's finger fully covers or partially covers one or more of graphical application icons 24. For example, if the user gripped the left side of mobile device 10, it may be possible for the user's left hand thumb to fully or partially cover graphical application icons 24A, 24D, and 24G. Similar to the above example, when the user grips mobile device 10 with both hands, it may be possible for the user's fingers to fully or partially cover one or more graphical application icons 24. For example, if the user gripped the left and right sides of mobile device 10, it may be possible for the user's left hand thumb to fully or partially cover graphical application icons 24A, 24D, and 24G, and for the user's right hand thumb to fully or partially cover graphical application icons 24C, 24F, and 24I.

Similar to the above examples, in some examples, mobile device 10 may determine that it is not resting against a surface, and in these instances, may display graphical application icons 24 in a layout different than graphical application icon 26A. For example, if the user is holding mobile device 10 with one hand, mobile device 10 may present graphical application icons 24 positioned towards the end of display 14 that is opposite to the side where the user is holding mobile device 10. As another example, if the user is holding mobile device 10 with both hands, mobile device 10 may present graphical application icons closer together and further away from the ends of display 14.

Figure 3B:
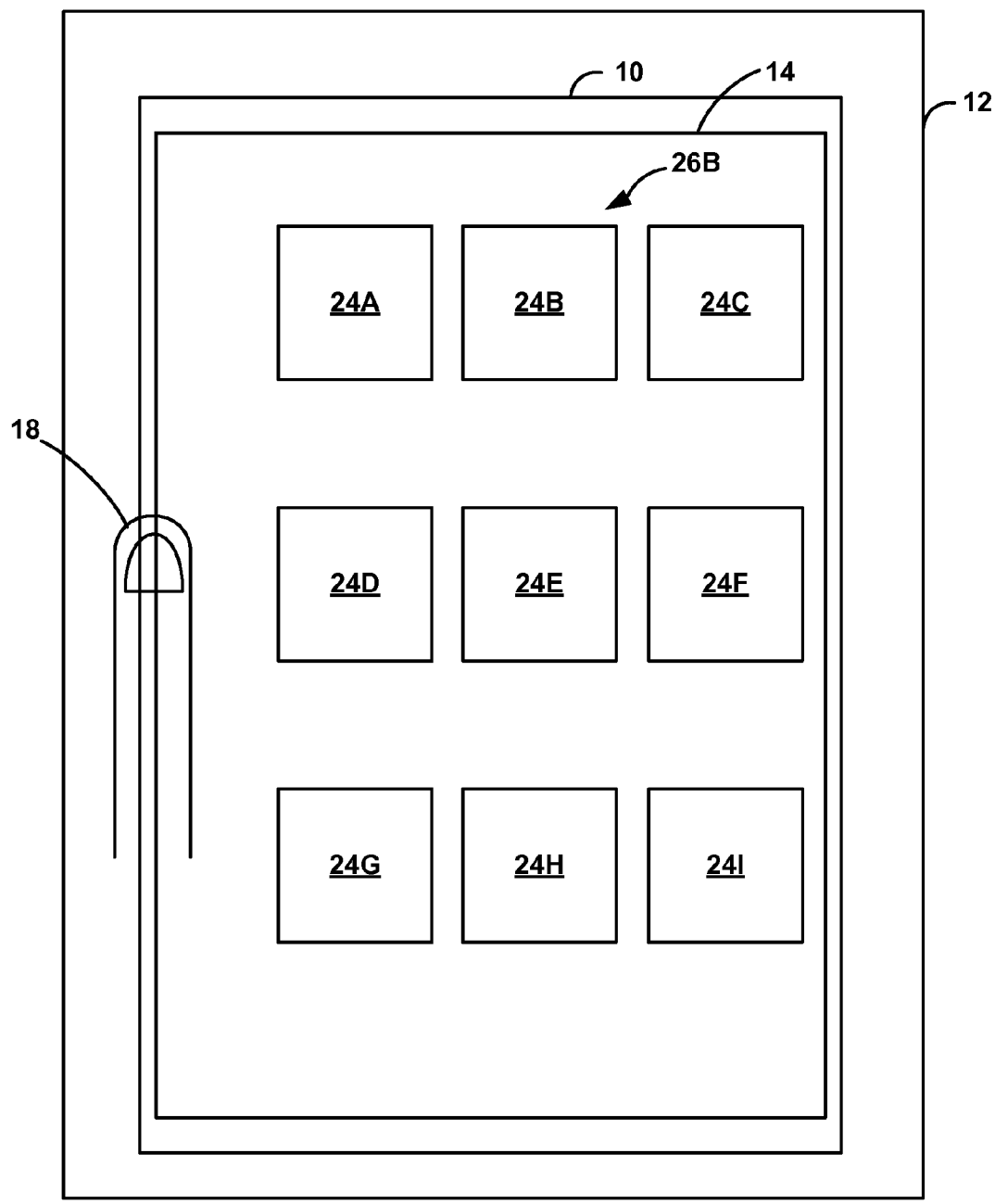
FIGS. 3B-3C are top views of a mobile device that is not resting against a surface.
Figure 3C:
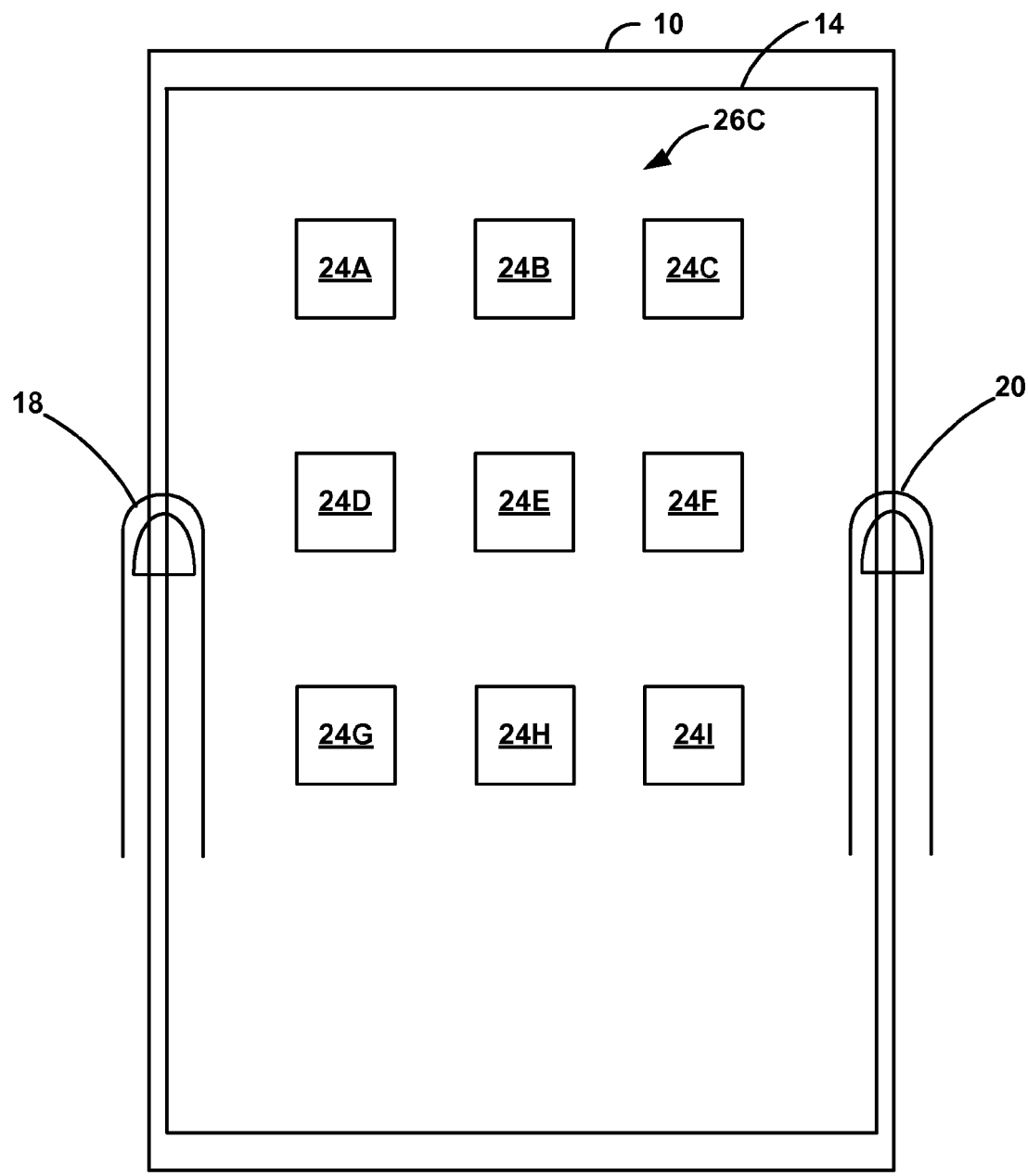

FIGS. 3B-3C are top views of a mobile device that is not resting against a surface. Similar to the examples of FIGS. 2B and 2C, in the examples of FIGS. 3B and 3C, the phrase "top view" may mean from the perspective of the user. For example, the phrase "top view" may refer to the viewpoint of the user viewing mobile device 10.

Similar to FIG. 2B, in the example illustrated in FIG. 3B, the user may grip the left side of mobile device 10 with the user's left hand, and thumb 18 may be the thumb of the user's left hand. In this example, upon determining that mobile device 10 is not resting against surface 12, and that the user is holding mobile device 10 with one hand, e.g., the left hand, mobile device 10 may cause display 14 to present graphical application icons 24 in the example graphical application icon layout 26B, as illustrated in FIG. 3B. Graphical application icon layout 26B may be another example of a graphical user-interface layout.

As illustrated in FIG. 3B, graphical application icon layout 26B may represent a layout where mobile device 10 positions graphical application icons 24 towards the opposite end of display 14 from the side of mobile device 10 where the user is holding mobile device 10. For example, in FIG. 3B, the user may be holding mobile device 10 at the left side of mobile device 10. In this example, graphical application icons 24 may be positioned towards the right end of display 14. In this manner, thumb 18 may be less likely to fully or partially cover one or more graphical application icons 24.

In some examples, the spacing between graphical application icons 24 may be reduced in graphical application icon layout 26B as compared to graphical application icon layout 26A. This reduction in spacing may allow mobile device 10 to fit graphical application icons towards the right end of display 14. In some examples, reduction in the spacing between graphical application icons 24 may not be sufficient to allow mobile device 10 to fit graphical applications icons 24 towards the right end of display 14. In such instances, mobile device 10 may reduce the size of graphical application icons 24, e.g., the width or the length and width of graphical application icons 24. In some alternate examples, mobile device 10 may first reduce the size of graphical application icons 24, and if the resized graphical application icons 24 do not fit, mobile device 10 may then reduce the spacing between graphical application icons 24.

Similar to FIG. 2C, in the example illustrated in FIG. 3C, the user may grip both sides, e.g., right and left sides, of mobile device 10 with user's right and left hands, and thumb 18 may be the thumb of the user's left hand, and thumb 20 may be the thumb of the user's right hand. In this example, upon determining that mobile device 10 is not resting against surface 12, and that the user is holding mobile device 10 with both hands, mobile device 10 may cause display 14 to present graphical application icons 24 in the example graphical application icon layout 26C, as illustrated in FIG. 3C. Graphical application icon layout 26C may be another example of a graphical user-interface layout.

As illustrated in FIG. 3C, graphical application icon layout 26C may represent a layout where mobile device 10 positions graphical application icons 24 further away from the ends of display 14. For example, in FIG. 3C, graphical application icons 24 positioned in the left most column may be positioned further away from the left end of display 14 in graphical application icon layout 26C, as compared to graphical application icon layout 26A. Similarly, in FIG. 3C, graphical application icons 24 positioned in the right most column may be positioned further away from the right end of display 14 in graphical application icon layout 26C, as compared to graphical application icon layout 26A. It may be possible for mobile device 10 to also position graphical application icons 24, that are in the top and bottom rows, further away from the top and bottom ends of display 14.

In some examples, the spacing between graphical application icons 24 may be reduced in graphical application icon layout 26C as compared to graphical application icon layout 26A. This reduction in spacing may allow mobile device 10 to fit graphical application icons further away from the right and left ends of display 14. In some examples, reduction in the spacing between graphical application icons 24 may not be sufficient to allow mobile device 10 to fit graphical applications icons 24 further away from the right and left ends of display 14. In such instances, mobile device 10 may reduce the size of graphical application icons 24, as illustrated in FIG. 3C. For example, the size of graphical application icons 24, in FIG. 3C, may be less than the size of graphical application icons 24 in FIG. 3A. Similar to the example of FIG. 3B, in some alternate examples, mobile device 10 may first reduce the size of graphical application icons 24, and if the resized graphical application icons 24 do not fit, mobile device 10 may then reduce the spacing between graphical application icons 24. For example, mobile device 10 may reduce the spacing between graphical application icons 24 based on where the user is holding mobile device 10. For instance, if the user is holding mobile device 10 approximately in the center and on the sides of mobile device 10, mobile device 10 may dynamically reduce the spacing between graphical application icons 24 such that graphical application icons 24 are not covered by the user's hands.

It should be understood that the illustrated examples are provided for ease of understanding and should not be considered as limiting. For example, a graphical user-interface should not be considered limited to a graphical keyboard or a graphical application icons. Also, the graphical user-interface layouts should not be considered limited to the layout of graphical keyboard 16A, 16B, and 16C, or graphical application icon layout 26A, 26B, and 26C. In general, aspects of this disclosure may be extendable to various instances where mobile device 10 may present a first graphical user-interface layout when mobile device 10 is resting against a surface, e.g., a surface that is not associated with a hand of the user such as surface 12, and a second, different graphical user-interface layout when mobile device 10 is not resting against the surface. Furthermore, in some examples, when mobile device 10 is not resting against a surface, mobile device 10 may further determine whether it is being held by one hand or both hands. Mobile device 10 may present a different graphical user-interface layout when the user is holding mobile device 10 with one hand, as compared to when the user is holding mobile device 10 with both hands.

Figure 4:
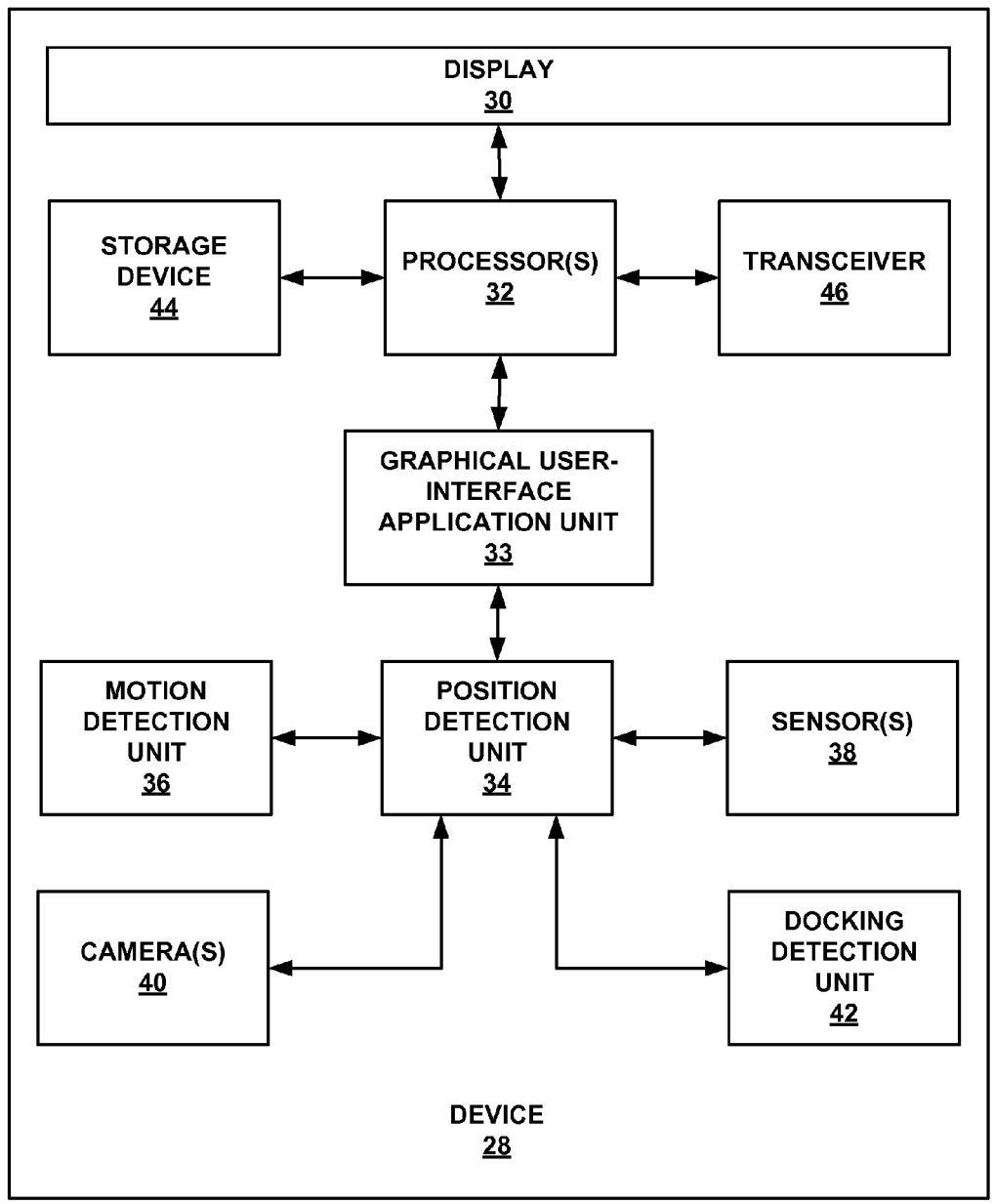
FIG. 4 is a block diagram illustrating an example of a device, in accordance with one or more aspects of this disclosure.

FIG. 4 is a block diagram illustrating an example of a device, in accordance with one or more aspects of this disclosure. FIG. 4 illustrates mobile device 28. Mobile device 28 may be substantially similar to mobile device 10. Examples of mobile device 28 include, but are not limited to, cellular phones, personal digital assistants (PDAs), portable gaming devices, portable media players, e-book readers, watches, tablet computing devices, and the like.

Mobile device 28 may include display 30, one or more processors 32, graphical user-interface application unit 33, position detection unit 34, motion detection unit 36, one or more sensors 38, one or more cameras 40, docking detection unit 42, storage device 44, and transceiver 46. Mobile device 28 may include additional components not shown in FIG. 4 for purposes of clarity. For example, mobile device 28 may also include a microphone and a speaker to effectuate telephonic communication. Mobile device 28 may also include a battery and/or another wired or wireless power supply that provides power to the components of mobile device 28. Mobile device 28 may also include a user interface. The user interface may be a physical user interface such as a keypad, trackball, mouse, or other such user interfaces that allow the user to interact with mobile device 28. In some examples, the user interface may be a graphical user interface (GUI) and be formed as part of display 30. In these examples, mobile device 28 may not necessarily include a physical user interface; however, it may be possible for mobile device 28 to include both a GUI and one or more physical interfaces.

Moreover, the components of mobile device 28 shown in FIG. 4 may not be necessary in every example of mobile device 28. For example, as described in more detail, position detection unit 34 may utilize one or more of motion detection unit 36, sensors 38, cameras 40, and docking detection unit 42 to determine whether mobile device 28 is resting against a surface, such as surface 12, and also whether the user is holding mobile device 28 with one or more both hands. However, position detection unit 34 may not utilize all of these units for such detection in every example. In these examples, mobile device 28 may not necessarily include units that are not needed for such detection.

For instance, position detection unit 34 may utilize only one or more sensors 38 to determine whether mobile device 28 is resting against a surface, and if not, whether the user is holding mobile device 28 with one or both hands. In this example, motion detection unit 36, one or more cameras 40, and docking detection unit 42 may not be necessary in mobile device 28. However, even in this example, it may be possible for mobile device 28 to include motion detection unit 36, one or more cameras 40, and/or docking detection unit 42 for other functions.

Although shown as separate components, in some examples, position detection unit 34, graphical user-interface application unit 33, and one or more processors 32 may be formed in a common hardware unit. In some examples, position detection unit 34 may be a software unit that is executed on one or more processors 32. Similarly, in some examples, graphical user-interface application unit 33 may be software unit that is executed on one or more processors 32.

In general, one or more of the units illustrated in FIG. 4, e.g., one or more processors 32, graphical user-interface application unit 33, and position detection unit 34, are illustrated as separate units for ease of describing the functional aspects of these units. However, it should be understood that such units need not necessarily be separate and distinct hardware or software units. Rather, in some examples, as described above, these units may be formed on a common hardware unit, or as common software executing on a hardware unit. In alternate examples, one or more these units may be separate hardware units, or separate software units.

Display 30 may be substantially similar to display 14. Examples of display 30 include, but are not limited to, a presence-sensitive display, such as a touch screen. Display 30 presents visual content of mobile device 28 to the user. For example, display 30 may present at least some or all of the applications executed on mobile device 28 such as an application to display a document, a web browser or a video game, content retrieved from external servers, and other functions that may need to be presented. Also, display 30 may present a graphical user-interface, such as anyone of graphical keyboards 16A, 16B, and 16C, as wells as graphical application icons 24 in graphical application icon layouts 26A, 26B, and 26C based on the position of mobile device 28.

One or more processors 32, graphical user-interface application unit 33, and position detection unit 34 may include any one or more of a microprocessor, a controller, a digital signal processor (DSP), an application specific integrated circuit (ASIC), a field-programmable gate array (FPGA), or equivalent discrete or integrated logic circuitry. One or more processors 32 may execute applications stored on storage device 44, in some examples. For ease of description, aspects of this disclosure are described in the context of a single processor 32. However, it should be understood that aspects of this disclosure described with a single processor 32 may be implemented in one or more processors.

The one or more applications that processor 32 executes may be stored in storage device 44, or retrieved from external devices via transceiver 46. Transceiver 46 is configured to transmit data to and receive data from one or more other devices. Transceiver 46 may support wireless or wired communication, and includes appropriate hardware and software to provide wireless or wired communication. For example, transceiver 46 may include an antenna, modulators, demodulators, amplifiers, and other circuitry to effectuate communication between mobile device 28 and one or more other devices.

Storage device 44 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media that stores data. In some examples, storage device 44 may store one or more instructions that cause one or more processors 32, graphical user-interface application unit 33, and position detection unit 34 to perform various functions ascribed to one or more processors 32, graphical user-interface application unit 33, and position detection unit 34. Storage device 44 may be considered as a computer-readable storage medium or a computer-readable storage device comprising instructions that cause one or more processors 32, graphical user-interface application unit 33, and position detection unit 34 to perform various functions.

Storage device 44 may, in some examples, be considered as a non-transitory storage medium. The term "non-transitory" may indicate that the storage medium is not embodied in a carrier wave or a propagated signal. However, the term "non-transitory" should not be interpreted to mean that storage device 44 is non-movable. As one example, storage device 44 may be removed from mobile device 28, and moved to another device. As another example, a storage device, substantially similar to storage device 44, may be inserted into mobile device 28. In certain examples, a "non-transitory" storage medium may store data that can, over time, change (e.g., in RAM), and/or store data that does not change over time. In some examples, a "non-transitory" storage medium may store data that remains stored in the storage medium even after mobile device 28 is turned off, or when power is removed from mobile device 28. In these examples, the data stored in the "non-transitory" storage medium may be retrieved after mobile device 28 is turned back on, or power to mobile device 28 is restored.

Position detection unit 34 may determine whether mobile device 28 is resting against a surface. Position detection unit 34 may also determine whether the user is holding mobile device 28 with one or more both hands, when mobile device 28 is not resting against the surface. Position detection unit 34 may utilize various different techniques to perform such determinations.

For example, as illustrated in FIG. 4, position detection unit 34 may be coupled to motion detection unit 36. Motion detection unit 36 may include one or more accelerometers, gyroscopes, or a combination thereof. When mobile device 28 is resting against the surface, mobile device 28 may not move. In this example, motion detection unit 36 may determine that mobile device 28 is not moving, and indicate to position detection unit 34 that mobile device 28 is not moving. Position detection unit 34 may conclude that mobile device 28 is resting against the surface. As another example, when mobile device 28 is resting against a surface, motion detection unit 36 may determine that mobile device 28 is lying flat, and indicate to position detection unit 34 that mobile device 28 is lying flat. Position detection unit 34 may conclude that mobile device 28 is resting against the surface. For example, the output from motion detection unit 36 may be an output signal to position detection unit 34 that indicates that motion detection unit 36 did not measure any movement of mobile device 28.

If mobile device 28 is not resting against the surface, mobile device 28 may move. For example, if the user is holding mobile device 28 with both hands, there may be some measurable amount of movement of mobile device 28. For instance, it may be relatively difficult for the user to grip mobile device 28 with one or both hands so that there is no movement of mobile device 28. In this example, motion detection unit 36 may detect or otherwise measure the movement of mobile device 28. For example, the accelerometer and/or gyroscope of motion detection unit 36 may detect the motion of mobile device 28. In these examples, motion detection unit 36 may indicate that mobile device 28 is moving, and may also indicate the amount by which mobile device 28 is moving to position detection unit 34. For example, the output signal from motion detection unit 36 may indicate that mobile device 28 is moving, and may also indicate the amount by which mobile device 28 is moving based on the measurements of the accelerometer and/or gyroscope of motion detection unit 36. Position detection unit 34 may then conclude that mobile device 28 is not resting against a surface. Position detection unit 34 may also determine whether the user is holding mobile device 28 with one or both hands based on the amount of measured movement.

For example, if the user is holding mobile device 28 with one hand, mobile device 28 may move more than it would when the user is holding mobile device 28 with both hands because holding mobile device 28 with both hands may provide additional support than holding mobile device 28 with one hand. Also, mobile device 28 may move more in the side where the user is not holding mobile device 28. Motion detection unit 36 may be configured to detect which side of mobile device 28 is moving more. Position detection unit 34 may receive an indication of the amount of movement from motion detection unit 36, and which side is moving more. Based on the indicated amount of movement by motion detection unit 36, position detection unit 34 may be able to determine whether mobile device 28 is resting against a surface, and if not, whether mobile device 28 is being held by one or both hands. Also, based on which side of mobile device 28 is moving more, position detection unit 34 may be able to determine which hand is holding mobile device 28 in examples where position detection unit 34 determined that the user is holding mobile device 28 with only one hand.

Position detection unit 34 may also be coupled to one or more cameras 40. The one or more cameras 40 may include a rear-facing camera and a front-facing camera. The front-facing camera may be a camera located on the front-side of mobile device 28. Display 30 may also be located on the front-side of mobile device 28. The rear-facing camera may be located on the back-side of mobile device 28.

When mobile device 28 is resting against a surface, the one or more cameras 40 may not detect much movement. For example, the rear-facing camera may only detect a constant black surface, as very light may escape to the rear-facing camera. As another example, the front-facing camera may not detect much movement because the user's face may remain in a generally constant area, and the background area to the user may remain fixed. In other words, when mobile device 28 is resting against a surface, one or more cameras 40 may capture only a still image. One or more cameras 40 may indicate to position detection unit 34 whether the one or more cameras 40 detect much movement. If the one or more cameras 40 do not detect much movement, position detection unit 34 may determine that mobile device 28 is resting against a surface.

When mobile device 28 is not resting against a surface, the one or more cameras 40 may detect movement. For example, the one or more cameras 40 may detect movement in the location of the user's face or the background to the user, e.g., with the front-facing camera. As another example, the one or more cameras 40 may no longer detect a constant black surface, e.g., with the rear-facing camera. For instance, the rear-facing camera may detect a substantially more amount of light when mobile device 28 is not resting against a surface, as compared to when mobile device 28 is resting against the surface. Also, the amount of movement detected by the one or more cameras 40 may be based on the whether the user is holding mobile device 28 with one or both hands. For example, when the user is holding mobile device 28 with both hands, there may be a measurable amount of movement that can be detected by one or more cameras 40. Similarly, when the user is holding mobile device 28 with one hand, the amount of movement that can be detected by one or more cameras 40 may be greater than the amount of movement detected when the user is holding mobile device 28 with both hands. Based on the detected amount of movement by one or more cameras 40, position detection unit 34 may be able to determine whether mobile device 28 is resting against a surface, and if not, whether mobile device 28 is being held by one or more hands.

Also, position detection unit 34 may be coupled to one or more sensors 38. The one or more sensors 38 may reside on the sides of mobile device 28. Examples of one or more sensors 38 include, but are not limited to, pressure sensors, capacitive sensors, proximity sensors, temperature sensors, and moisture sensors. One or more sensors 38 may become activated with the user's touch.

When mobile device 28 is resting against the surface, the user may not be touching the sides of mobile device 28. In this instance, one or more sensors 38 may remain deactivated. Position detection unit 34 may determine that one or more sensors 38 are deactivated and may conclude that mobile device 28 is resting against the surface.

When mobile device 28 is not resting against the surface, the user may be holding mobile device 28. To hold mobile device 28, the user may activate one or more sensors 38. For example, if the user is holding mobile device 28 with both hands, the user may activate the one or more sensors 38 that are located on the right and left sides of mobile device 28. If the user is holding mobile device 28 with only one hand, the user may activate either the one or more sensors 38 located on the right side of mobile device 28, or the left side of mobile device 28.

As one example, the user holding the right and/or left side of mobile device 28 may put pressure on sensors 38, which may activate sensors 38. As another example, the user holding the right and/or left side of mobile device 28 may cause the temperature on sensors 38 to increase, which may activate sensors 38. As another example, the user holding the right and/or left side of mobile device 28 may cause the proximity sensors of sensors 38 to detect that the user's hand or hands are holding mobile device 28, which may activate sensors 38. As another example, the user holding the right and/or left side of mobile device 28 may cause the moisture on sensors 38 to change, which may activate sensors 38.

Position detection unit 34 may determine that one or more sensors 38 are activated and may conclude that mobile device 28 is not resting against the surface. Based on how many of the one or more sensors 38 and which ones of the one or more sensors 38 are activated, position detection unit 34 may be able to determine whether mobile device 28 is resting against a surface, and if not, whether mobile device 28 is being held by one or both hands.

In some examples, position detection unit 34 may be coupled to docking detection unit 42. Docking detection unit 42 may be coupled to one or more connection points of mobile device 28 that mate with connection points of a docking station. For example, to dock mobile device 28 to the docking station, the connection points of mobile device 28 may mate with the connection points of the docking station. In some examples, the connection points of mobile device 28 may be located at the bottom, top, or on either side of mobile device 28.

Docking detection unit 42 may determine whether or not the one or more connection points of mobile device 28 have mated with connection points of a docking station. If docking detection unit 42 determines that the connection points of mobile device 28 have mated with connection points of a docking station, position detection unit 34 may determine that mobile device 28 is resting against a surface. If, however, docking detection unit 42 determines that the connection points of mobile device 28 have not mated with connection points of a docking station, position detection unit 34 may determine that mobile device 28 is not resting against the surface.

In the above examples, position detection unit 34 may utilize the measurements of any of motion detection unit 36, one or more sensors 38, one or more cameras 40, and docking detection unit 42 to determine whether mobile device 28 is resting against the surface, and if not, whether the user is holding mobile device 28 with one or more both hands. In some examples, to further ensure that position detection unit 34 properly determined whether mobile device 28 is resting against the surface, and if not, whether the user is holding mobile device 28 with one or more both hands, position detection unit 34 may utilize the measurements from two or more of motion detection unit 36, one or more sensors 38, one or more cameras 40, and docking detection unit 42. For example, position detection unit 34 may receive the measurements from both motion detection unit 36 and one or more sensors 38. Based on the measurements, position detection unit 34 may determine whether mobile device 28 is resting against the surface, and if not, whether the user is holding mobile device 28 with one hand or both hands. Also, if position detection unit 34 determines that the user is holding mobile device 28 with one hand, position detection unit 34 may also determine with which hand the user is holding mobile device 28.

It should be understood that the techniques described above for position detection unit 34 are described for purposes of illustration only. Position detection unit 34 may utilize techniques in addition to or instead of those described above.

Position detection unit 34 may indicate to graphical user-interface application unit 33 whether mobile device 28 is resting against the surface, or is not resting against the surface. If mobile device 28 is not resting against the surface, position detection unit 34 may indicate to graphical user-interface application unit 33 whether the user is holding mobile device 28 with one or both hands. If the user is holding mobile device 28 with one hand, position detection unit 34 may indicate with which hand the user is holding mobile device 28 to graphical user-interface application unit 33.

Based on the received information from position detection unit 34, graphical user-interface application unit 33 may select which graphical user-interface layout display 26 should present. For example, graphical user-interface application unit 33 may select among the graphical keyboard layouts of graphical keyboard 16A, 16B, or 16C. As another example, graphical user-interface application unit 33 may select among graphical application icon layouts 26A, 26B, and 26C.

For example, if position detection unit 34 indicated that mobile device 28 is resting against a surface, graphical user-interface application unit 33 may select a first graphical user-interface layout. For instance, graphical user-interface application unit 33 may select a graphical keyboard substantially similar to graphical keyboard 16A (FIG. 1B), or select a graphical application icon layout substantially similar to graphical application icon layout 26A (FIG. 3A).

If position detection unit 34 indicated that mobile device 28 is not resting against a surface, graphical user-interface application unit 33 may select a second graphical user-interface layout, different than the first graphical user-interface layout. For example, if position detection unit 34 indicated that the user is holding mobile device 28 with the users left hand, graphical user-interface application unit 33 may select a graphical keyboard substantially similar to graphical keyboard 16B (FIG. 2B), or select a graphical application icon layout substantially similar to graphical application icon layout 26B (FIG. 3B). As another example, if position detection unit 34 indicated that the user is holding mobile device 28 with both hands, graphical user-interface application unit 33 may select a graphical keyboard substantially similar to graphical keyboard 16C (FIG. 2C), or select a graphical application icon layout substantially similar to graphical application icon layout 26C (FIG. 3C).

Graphical user-interface application unit 33 may indicate to processor 32 which graphical user-interface layout graphical user-interface application unit 33 selected. In response, processor 32 may cause display 30 to present the selected graphical user-interface layout. The user may then utilize the presented graphical user-interface. For example, processor 32 may cause display 30 to present a first graphical keyboard layout when mobile device 28 is resting against a surface, and cause display 30 to present a second graphical keyboard layout when mobile device 28 is not resting against a surface. In the above examples, graphical user-interface application unit 33 may select the first and second graphical keyboard layouts.

Figure 5:
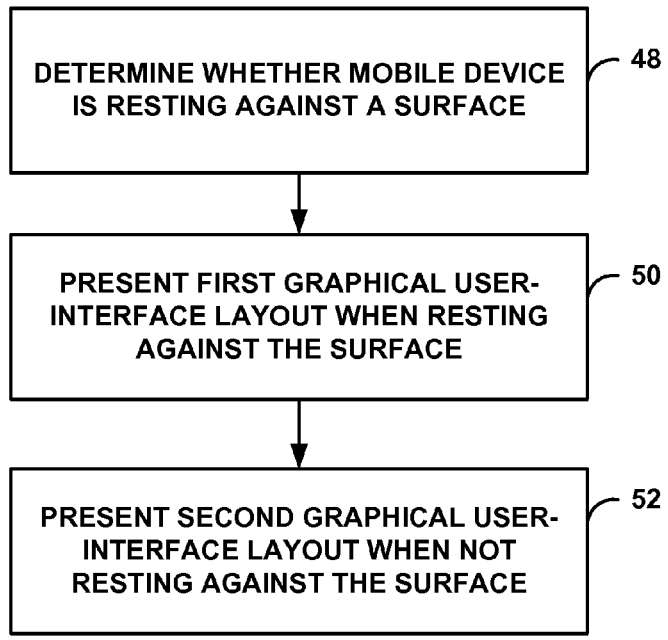
FIGS. 5-6 are flow charts illustrating example operations of a mobile device, in accordance with one or more aspects of this disclosure.
Figure 6:
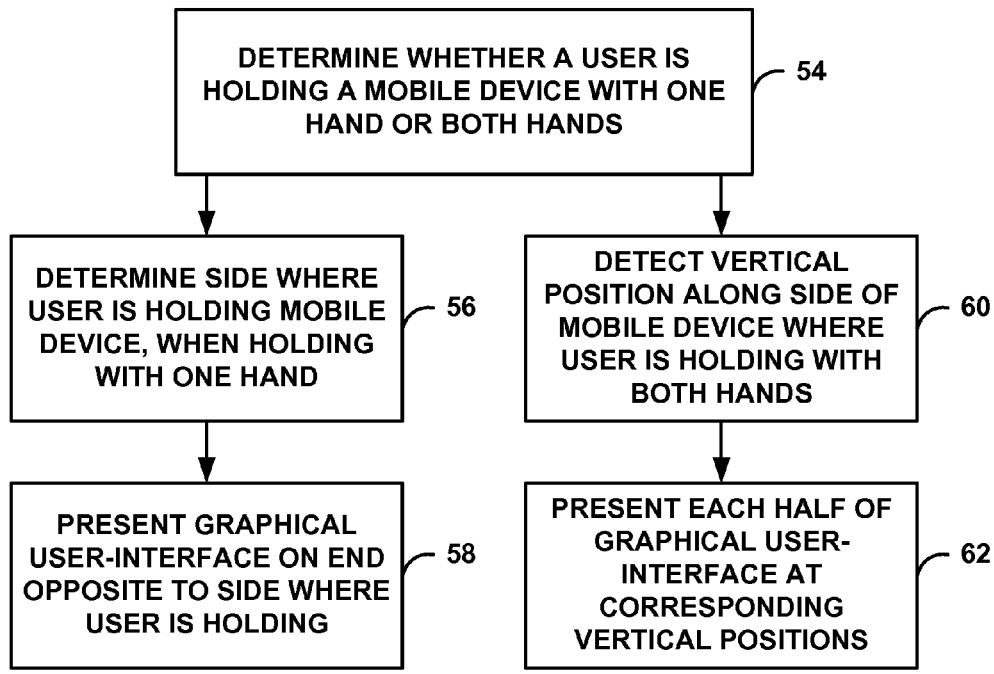

FIGS. 5-6 are flow charts illustrating example operations of a mobile device, in accordance with one or more aspects of this disclosure. For purposes of illustration only, reference is made of FIGS. 1A, 1B, 2A-2C, 3A-3C, and 4.

In FIG. 5, A determination of whether a mobile device is resting against a surface may be made (48). The surface may be a surface that is not associated with a hand of a user, e.g., the user is not holding mobile device 28. For example, position detection unit 34 may determine whether mobile device 28 is resting against surface 12. As one example, position detection unit 34 may receive measurements from one or more of motion detection unit 36, one or more sensors 38, one or more cameras 40, and docking detection unit 42. For instance, if motion detection unit 36 indicates that mobile device 28 is not moving, position detection unit 34 may determine that mobile device 28 is resting against surface 12. If one or more sensors 38 indicate that the user is not holding mobile device 28, position detection unit 34 may determine that mobile device 28 is resting against surface 12. If one or more cameras 40 capture only a still image, position detection unit 34 may determine that mobile device 28 is resting against surface 12. If docking detection unit 42 detects that mobile device 28 is docked to a docking station, position detection unit 34 may determine that mobile device 28 is resting against a surface. In this example, the docking station may be considered as the surface.

A first graphical user-interface layout may be presented when the mobile device is resting against the surface (50). Examples of the first graphical user-interface layout may be the graphical keyboard layout of graphical keyboard 16A, or graphical application icon layout 26A. Position detection unit 34 may indicate to graphical user-interface application unit 33 that mobile device 28 is resting against a surface. In response, graphical user-interface application unit 33 may select the graphical keyboard layout of graphical keyboard 16A, or graphical application icon layout 26A, and indicate the selection to processor 32. Processor 32 may cause display 30 to present the graphical user-interface in the selected graphical user-interface layout. In some examples, the layout of graphical keyboard 16A may be a continuous graphical keyboard that is approximately centered in a horizontal axis of display 26. In some example, the layout of graphical application icon layout 26A may be an arrangement of a plurality of graphical application icons 24 arranged in rows and columns at a distance away from the right and left end of display 30 and of a particular size, e.g., particular width and length.

A second graphical user-interface layout may be presented when the mobile device is not resting against the surface (52). Two examples of the second graphical user-interface layout may be the graphical keyboard layout of graphical keyboard 16B, and graphical application icon layout 26B. The layout of graphical keyboard 16B may be a continuous graphical keyboard that is graphically positioned towards an end of display 30. The layout of graphical application icon layout 26B may be an arrangement of the plurality of graphical application icons 24 arranged in the rows and columns positioned further towards an end of display 30 as compared to the plurality of graphical application icons 24 presented in graphical user-interface layout 26A. In some examples, the size of the graphical application icons 24 in graphical application icon layout 26B may be less than the size of the graphical application icons 24 in graphical application icon layout 26A. The end of display 30 may be opposite to the side where the user is holding mobile device 28.

Two other examples of the second graphical user-interface layout may be the graphical keyboard layout of graphical keyboard 16C, or graphical application icon layout 26C. The layout of graphical keyboard 16C may be a split graphical keyboard with two disjointed halves, e.g., portions 22A and 22B. In some examples, processor 32 may cause display 30 to display portions 22A and 22B at a vertical position of display 30 that corresponds to the vertical positions of the hands of the user on mobile device 28. The layout of graphical application icon layout 26C may be an arrangement of the plurality of graphical application icons 24 positioned further away, e.g., greater distance, from the right and left ends of display 30 as compared to the plurality of graphical application icons 24 presented in graphical user-interface layout 26A. In some examples, the size of the graphical application icons 24 in graphical application icon layout 26C may be less than the size of the graphical application icons 24 in graphical application icon layout 26A.

As indicated above, FIG. 6 is a flow chart illustrating an example operation of a mobile device, in accordance with one or more aspects of this disclosure. For purposes of illustration only, reference is made of FIGS. 1A, 1B, 2A-2C, 3A-3C, and 4. The example of FIG. 6 may be applicable in instances where the mobile device is determined to not be resting against a surface.

In FIG. 6, a determination of whether a user is holding a mobile device with one or both hands may be made (54). For example, position detection unit 34 may receive measurements from one or more of motion detection unit 36, one or more sensors 38, one or more cameras 40, and docking detection unit 42 that indicate whether the user is holding mobile device 28 with one or both hands.

A detection of a side where the user is holding mobile device 28 may be made when the user is holding mobile device 28 with one hand (56). A graphical user-interface may be presented approximately towards an end of display 30 that is opposite the side where the user is holding mobile device 28 (58).

A determination of vertical positions along sides of mobile device 28 where the user is holding mobile device 28 may be made when the user is holding mobile device 28 with both hands (60). In examples where the graphical user-interface comprises a split graphical keyboard, disjointed halves of a split graphical keyboard may be presented at vertical positions of display 30 that correspond to the vertical positions where the user is holding mobile device 28 (62).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may comprise a computer data storage medium such as RAM, ROM, NVRAM, EEPROM, flash memory, magnetic or optical data storage media, and the like. The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
   determining, by a mobile device, whether the mobile device is contacting a surface that is not associated with a hand of a user of the mobile device;
   presenting, at a presence-sensitive screen of the mobile device, a first graphical keyboard layout responsive to determining that the mobile device is contacting the surface;
   determining, by the mobile device, whether the user is holding the mobile device with one hand or both hands responsive to determining that the mobile device is not contacting the surface;
   responsive to determining that the user is holding the mobile device with both hands and that the mobile device is not contacting the surface, presenting, at the presence-sensitive screen of the mobile device, a second graphical keyboard layout, different from the first graphical keyboard layout, the second graphical keyboard layout comprising a split graphical keyboard having disjointed halves that are graphically positioned towards opposite ends of the presence-sensitive screen; and
   responsive to determining that the user is holding the mobile device with one hand and that the mobile device is not contacting the surface:
     determining a side of the mobile device where the user is holding the mobile device; and
     presenting a single continuous graphical keyboard that is graphically positioned towards an end of the presence-sensitive screen that is opposite to the side of the mobile device where the user is holding the mobile device with one hand.

2. The method of claim 1, wherein presenting the first graphical keyboard layout comprises presenting the continuous graphical keyboard layout, centered along substantially a horizontal axis of the presence-sensitive screen, such that a distance between neighboring icons of the continuous keyboard layout is substantially a same distance.

3. The method of claim 1, further comprising:
   responsive to determining that the user is holding the mobile device with both hands and that the mobile device is not contacting the surface, determining a vertical position along a first side of the mobile device where the user is holding the mobile device; and
   responsive to determining that the user is holding the mobile device with both hands and that the mobile device is not contacting the surface, determining a vertical position along a second, different side of the mobile device where the user is holding the mobile device,
   wherein presenting the second graphical keyboard layout comprises presenting a first half of the disjointed halves at a vertical position at a first end of the presence-sensitive screen that corresponds to the vertical position at the first side of the mobile device where the user is holding the mobile device, and presenting a second half of the disjointed halves at a vertical position at a second end of the presence-sensitive screen that corresponds to the vertical position at the second side of the mobile device where the user is holding the mobile device.

4. The method of claim 1, wherein determining whether the mobile device is contacting the surface comprises determining whether the mobile device is contacting the surface based at least on a measurement from an accelerometer or gyroscope.

5. The method of claim 1, wherein determining whether the mobile device is contacting the surface comprises determining whether the mobile device is contacting the surface based at least on a measurement from one or more sensors on sides of the mobile device.

6. The method of claim 1, wherein determining whether the mobile device is contacting the surface comprises determining whether the mobile device is contacting the surface based at least on a measurement from one or more cameras of the mobile device.

7. The method of claim 1, wherein determining whether the mobile device is contacting the surface comprises determining whether the mobile device is contacting the surface based at least on a detection by a docking detection unit.

8. A method comprising:
   determining, by a mobile device, whether the mobile device is contacting a surface that is not associated with a hand of a user of the mobile device;
   responsive to determining that the mobile device is contacting the surface, presenting, at a presence-sensitive screen of the mobile device, a plurality of graphical application icons arranged in rows and columns at a first distance away from a first and second end of the presence-sensitive screen and of a first size;
   determining, by the mobile device, whether the user is holding the mobile device with one hand or both hands responsive to determining that the mobile device is not contacting the surface;
   responsive to determining that the user is holding the mobile device with both hands and that the mobile device is not contacting the surface, presenting the plurality of graphical application icons arranged in the rows and columns at a second distance, greater than the first distance, away from the first and second end of the presence-sensitive screen and of a second size less than the first size; and
   responsive to determining that the user is holding the mobile device with one hand and that the mobile device is not contacting the surface, presenting the plurality of graphical application icons arranged in the rows and columns positioned further towards an end of the presence-sensitive screen as compared to the plurality of graphical application icons presented responsive to determining that the user is holding the mobile device with both hands and responsive to determining that the mobile device is contacting the surface.

9. A computer-readable storage medium comprising instructions that, when executed, cause one or more processors of a mobile device to perform operations comprising:
   determining whether the mobile device is contacting a surface that is not associated with a hand of a user of the mobile device;
   presenting, at a presence-sensitive screen of the mobile device, a first graphical keyboard layout responsive to determining that the mobile device is contacting the surface;
   determining whether the user is holding the mobile device with one hand or both hands responsive to determining that the mobile device is not contacting the surface;
   responsive to determining that the user is holding the mobile device with both hands and that the mobile device is not contacting the surface, presenting, at the presence-sensitive screen of the mobile device, a second graphical keyboard layout, different from the first graphical keyboard layout, the second graphical keyboard layout comprising a split graphical keyboard having disjointed halves that are graphically positioned towards opposite ends of the presence-sensitive screen; and
   responsive to determining that the user is holding the mobile device with one hand and that the mobile device is not contacting the surface:
      determining a side of the mobile device where the user is holding the mobile device; and
      presenting a single continuous graphical keyboard that is graphically positioned towards an end of the presence-sensitive screen that is opposite to the side of the mobile device where the user is holding the mobile device with one hand.

10. A mobile device comprising:
a presence-sensitive screen; and
one or more processors configured to:
   determine whether the mobile device is contacting a surface that is not associated with a hand of a user of the mobile device;
   cause the presence-sensitive screen to present a first graphical keyboard layout responsive to determining that the mobile device is contacting the surface;
   determine whether the user is holding the mobile device with one hand or both hands responsive to determining that the mobile device is not contacting the surface;
   responsive to determining that the user is holding the mobile device with both hands and that the mobile device is not contacting the surface, cause the presence-sensitive screen to present a second graphical keyboard layout, different from the first graphical keyboard layout, the second graphical keyboard layout comprising a split graphical keyboard having disjointed halves that are graphically positioned towards opposite ends of the presence-sensitive screen; and
   responsive to determining that the user is holding the mobile device with one hand and that the mobile device is not contacting the surface:
      determine a side of the mobile device where the user is holding the mobile device; and
      present a single continuous graphical keyboard that is graphically positioned towards an end of the presence-sensitive screen that is opposite to the side of the mobile device where the user is holding the mobile device with one hand.

* * * * *